Sept. 17, 1968    J. HARBOUR    3,402,356
POSITION RESPONSIVE SWITCHING SYSTEMS
Filed March 16, 1966    13 Sheets-Sheet 1

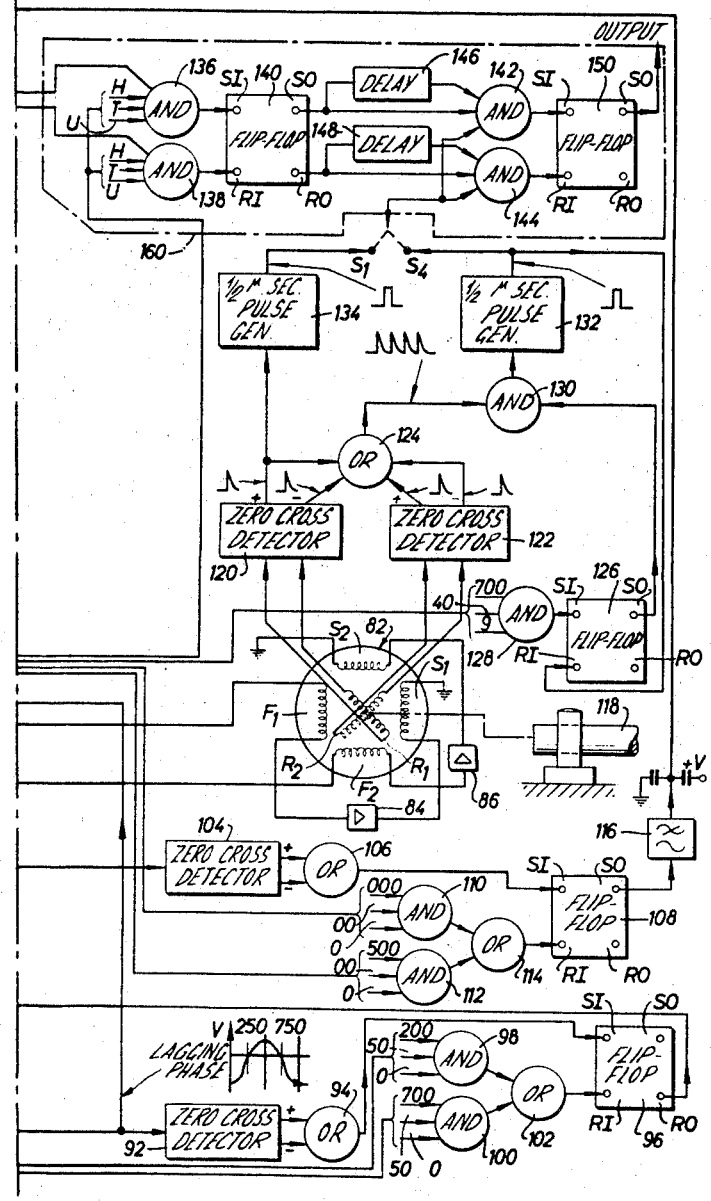

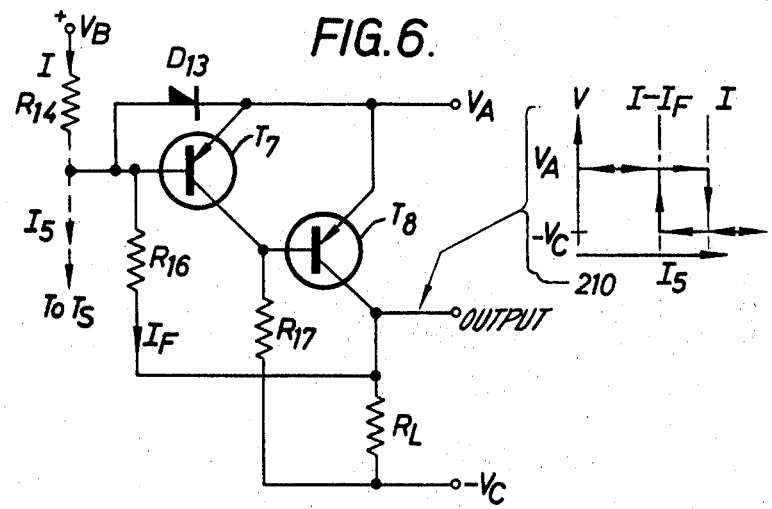
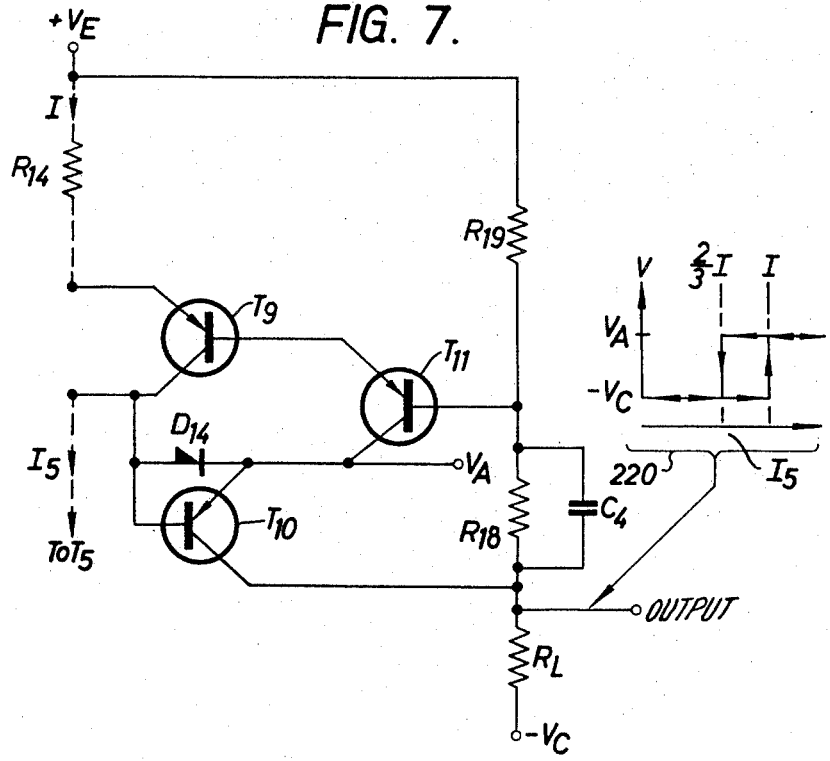

Sept. 17, 1968

J. HARBOUR 3,402,356

POSITION RESPONSIVE SWITCHING SYSTEMS

Filed March 16, 1966

J. HARBOUR 3,402,356

POSITION RESPONSIVE SWITCHING SYSTEMS

Filed March 16, 1966

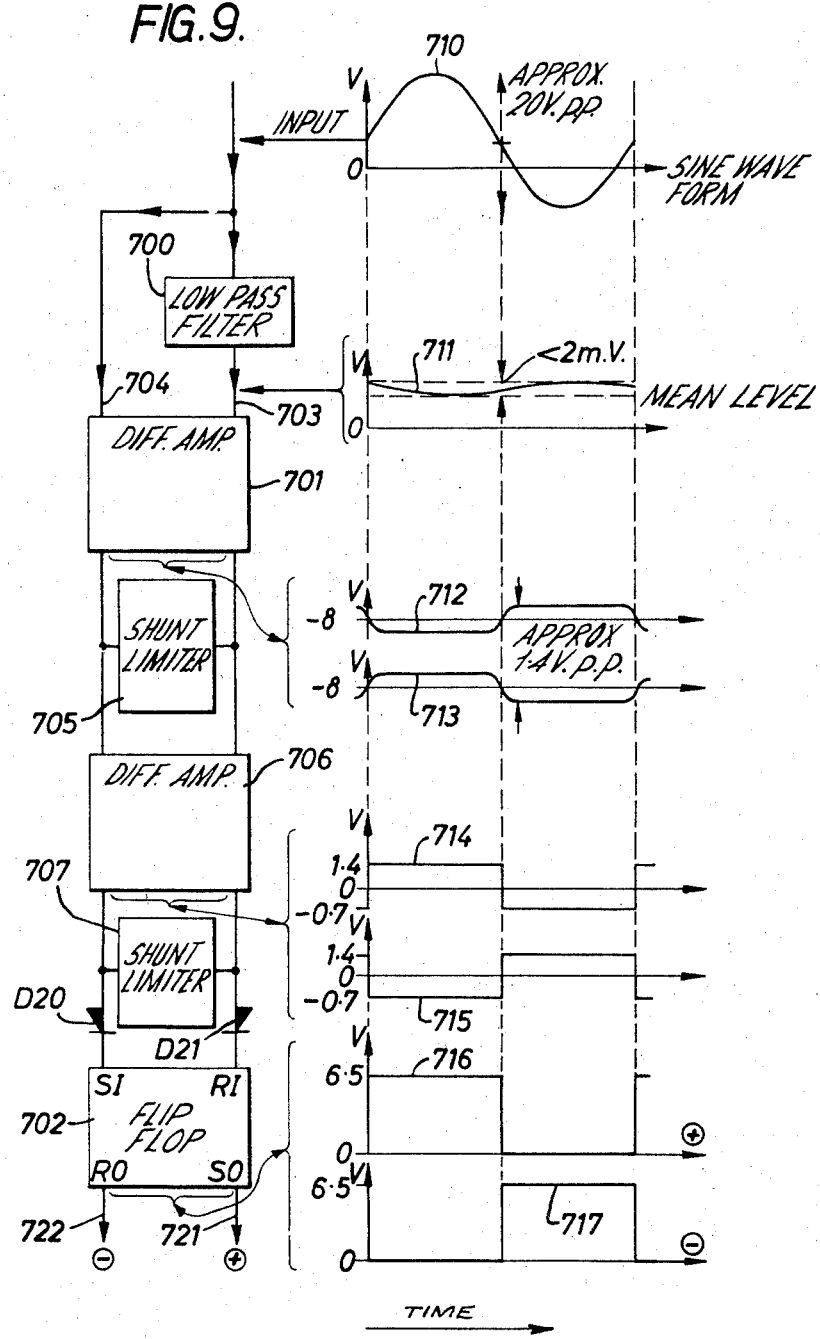

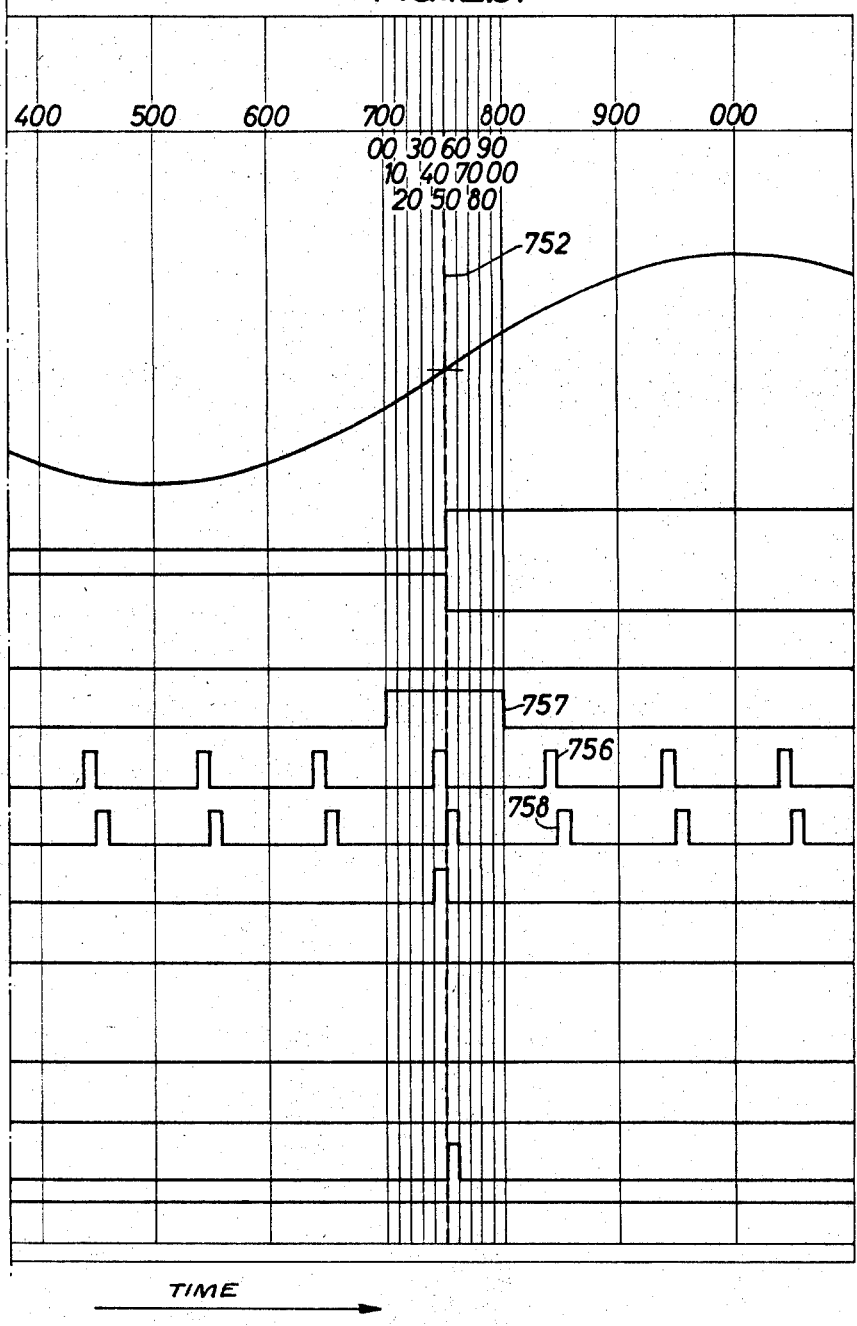

United States Patent Office
3,402,356
Patented Sept. 17, 1968

3,402,356
POSITION RESPONSIVE SWITCHING SYSTEMS
John Harbour, Kilbirnie, Scotland, assignor to Imperial Chemical Industries Limited, London, England
Filed Mar. 16, 1966, Ser. No. 534,902
Claims priority, application Great Britain, Mar. 19, 1965, 11,656/65
28 Claims. (Cl. 328—155)

ABSTRACT OF THE DISCLOSURE

Switching systems are disclosed giving output signals corresponding to predetermined positions of a movable member along a given path. A number generator provides cyclic successions of signals each corresponding to a particular position of the member. In each number generator cycle a strobe pulse generator associated with the member provides a pulse whose phase relative to the number generator cycle indicates the instantaneous position of the member. Gating means responsive to preselected number generator signals corresponding to predetermined positions of the member pass a strobe pulse to provide an output signal only when the member is at such positions.

---

The present invention relates to position responsive switching systems and is particularly concerned with switching systems for providing at least one output signal when a movable member is in a predetermined position or range of positions.

It is known to provide a series of cam operated switches, especially micro switches, for providing a series of output signals in response to movement of a movable member, such as a shaft, with preselected positions. In many cases the micro switches are held in fixed positions and adjustment of the related position at which each switch is operated and released is effected by adjusting the position of the corresponding cam relatively to the movable member. This necessitates stopping the movable member and in the case of an industrial machine access to the cam may not be easy. Furthermore when many output signals are required the provision of all the necessary cams and micro switches may prove difficult when space on the machine is at a premium. With mechanically operated switches it is very difficult to avoid wear taking place with continual long term operation and any initial accuracy and reliability of operation may be offset by the need for correcting readjustment from time to time, especially as wear may result in closely related output signals occurring in a different phase relationship to one another or even in a different sequence.

The present invention envisages a position responsive switching system which for the most part is static and which is capable of selective adjustment of the locations of a movable member at which an output signal should start and finish without necessitating access to movable members.

According to the present invention a position responsive switching system for providing at least one output signal corresponding to a predetermined position or range of positions of a movable member along a given path, comprises cyclically operable number generating means having a number range corresponding substantially to the total range of movement of the movable member along the given path for providing a succession of output signals each corresponding to a particular position of the movable member within the total range of movement along the given path, strobe pulse generating means associated with the movable mmeber for generating with each cycle of the number generating means a pulse, the phase of which relatively thereto is indicative of the instantaneous position of the movable member along the given path, gating means responsive to a preselected signal or signals from the number generating means corresponding to predetermined position or positions of the movable member for passing a strobe pulse to provide an output signal only when the movable member is at said predetermined position or between said predetermined positions.

The strobe pulse generating means may comprise digital encoding means associated with the movable member for providing a digitized pulse signal indicative of the position of the movable member and which, together with signals from the number generating means, is passed to a coincidence detector which can deliver a strobe pulse when the signal from the number generating means corresponds to the instaneous position of the movable member. The digital encoding means may be in the form of a coded disc from which signals may be read out optically, magnetically, electrostatically or by contact-making.

In a preferred arrangement the strobe pulse generating means comprises an electromagnetic transducer associated with the movable member and to which are applied sine wave signals phase and frequency related to the cyclic operation of the number generating means and from which a resultant A.C. signal whose phase relationship with the applied signals is determined by the instantaneous position of the movable member, is applied to a detector for generating a strobe pulse at a predetermined point in each cycle of said resultant A.C. signal. The transducer may conveniently be a synchro-resolver, preferably a feedback resolver, and the detector is preferably a zero crossing detector for providing a strobe pulse when the resultant A.C. signal crosses zero in a predetermined direction, for example from negative to positive.

A switching system embodying the present invention is suitable for application to many industrial operations and the movable member may itself be a shaft, one revolution of which corresponds to a complete cycle of manufacturing or processing operations. If the path of the movable member should be other than circular, it would in many cases be possible to provide a rotary member connected to the movable member by suitable transmission so as to fulfil this requirement that one revolution should correspond to the total movement of the movable member along its given path, alternatively a linear resolver can be used.

Andy desired number of output signals may be provided in accordance with operational requirements by providing a sufficient number of gating means each responsive to individually preselected signal or signals from the number generating means. If any particular output signal is desired at two spaced positions of the movable member, i.e. in the case of a shaft at equiangularly spaced positions, a second strobe pulse can be provided by the zero crossing detector when the resultant A.C. signal applied thereto crosses zero in the opposite direction, i.e. from positive to zero, and applied to a single gating means which then need only be responsive to one preselected signal or one set of preselected signals from the number generating means: such preselected signal or signals should lie in two adjacent quadrants of the shaft and the strobe pulses should be gated so that only those pulses which occur during the range of the number generating means corresponding to these quadrants are passed to the gating means. If the transducer is adapted to provide an additional resultant A.C. signal which is phase displaced by 90° electrically to the first-mentioned resultant signal two zero crossing detectors may be provided for providing four strobe pulses which can be applied, suitably gated, to a single gating means responsive to one preselected signal or one set of preselected signals from the number generating means, for providing four output signals when the shaft is in or between four equi-angularly spaced positions or sets of positions.

Appropriate output signals from the number generating means can be used to excite a sine wave generating system having a tuned circuit resonating at a desired cyclic frequency of the number generating means. By comparing the phase of a resultant sine wave with that of some corresponding output signals of the number generating means any necessary frequency correcting signal can be obtained and used to control the frequency of a clock generator driving the number generating means. A normal phase sine wave signal and, by means of an RC circuit, a lagging phase sine wave signal lagging by 90° can be obtained from the sine wave generating means and applied to stator windings of a feedback resolver serving as transducer: by comparing the phase of the lagging phase sine wave signal with appropriate output signals of the number generating means, the phase relationship between the sine wave signals can be well maintained by including a thermistor in the RC circuit and energizing its thermal element in response to such phase comparison or by including in the RC circuit a photo resistor responsive to a beam of light whose intensity is varied in response to such phase comparison.

Provision can be made for incorporating some backlash in the system, especially if the operational requirements of the movable member are such that it may, on occasions, be stationary or may move intermittently or may be moved in opposite directions, with a view to avoiding an output signal becoming indeterminate if the movable member should be stopped at a particular position at which that output signal was intended to have started or have ceased: such backlash can make allowance for any play or elastic deformation in a drive to the movable member or in the movable member itself. Such backlash may not be required if the movable member is intended for continuous movement.

By using only a single transducer, only one movable part is essentially required in the system. Adjustment of preselected positions associated with output signals can be readily effected at a location away from any industrial or other machine of which the movable member forms part. Additional output signals can be obtained by adding further gating means at such location and access to the movable member is not necessary. Moreover by using a resolver as transducer, its rotor can be tightly connected to the movable member, i.e. substantially without play or backlash, and any adjustment of the zero signal of the number generating means with respect to the position of the movable member can be effected by angularly adjusting the position of its stator.

The invention will be further described by way of example with reference to the accompanying drawings which illustrate one embodiment of the invention, and in which.

Figure 1A:
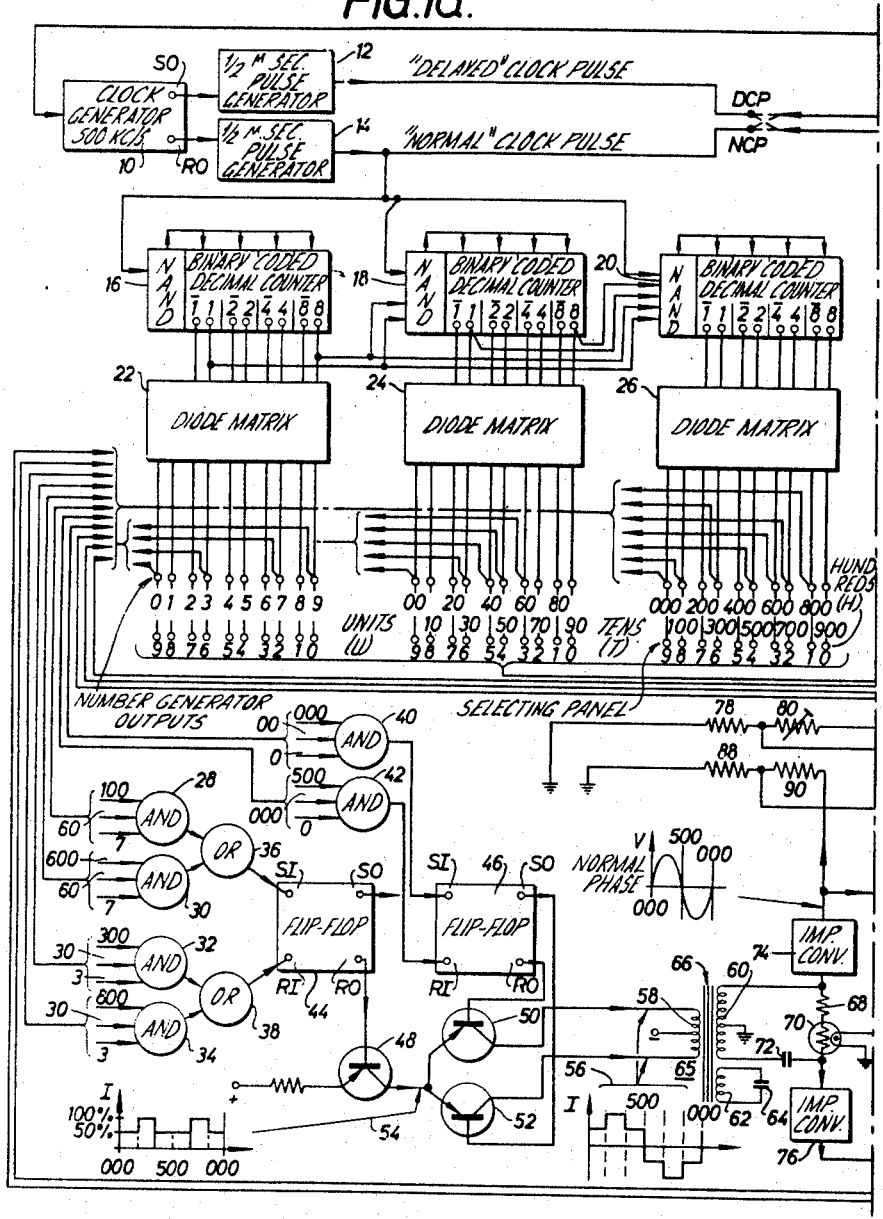
FIG. 1 (a and b) is a block schematic diagram of one arrangement of position controlled switching means according to the present invention.
Figure 3:
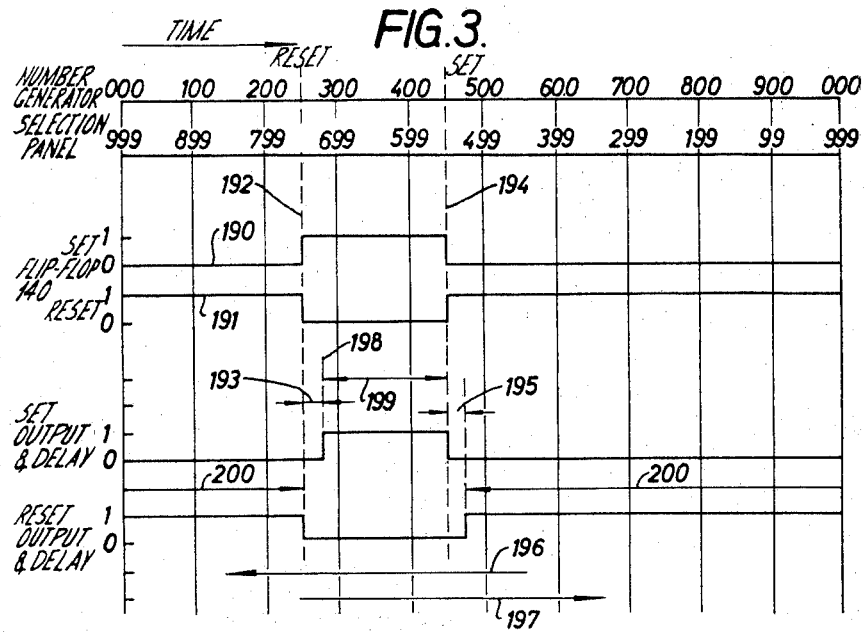
Figure 5:
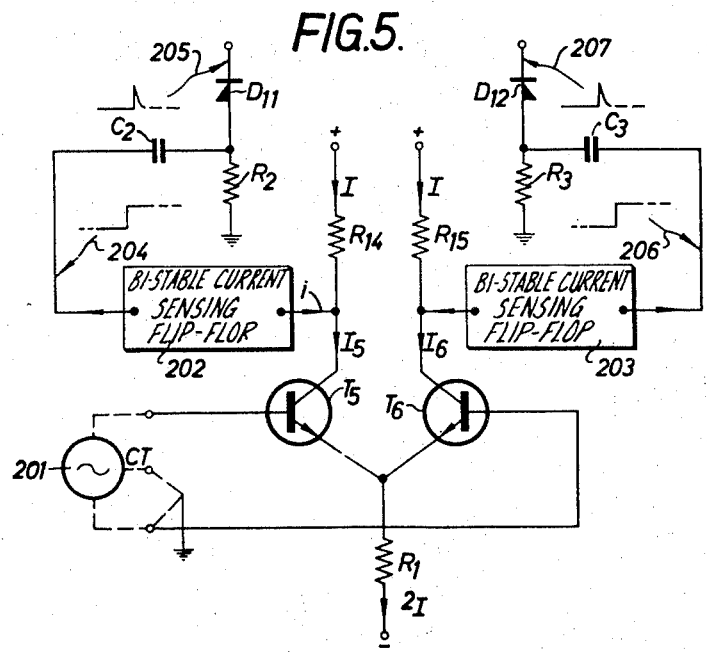
Figure 4:
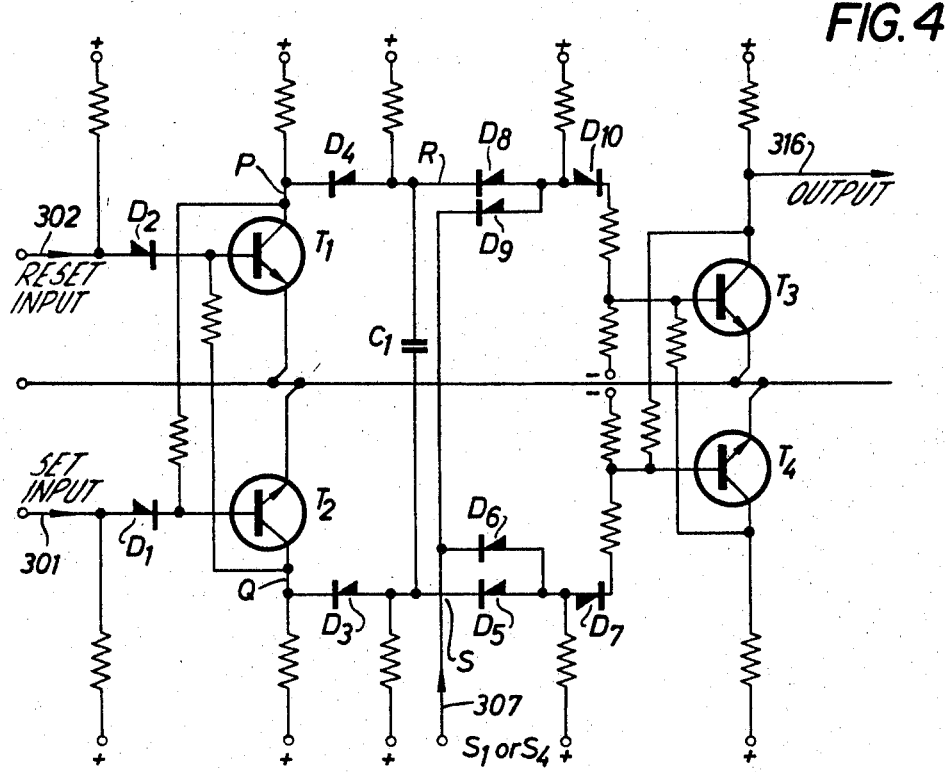
Figure 4A:
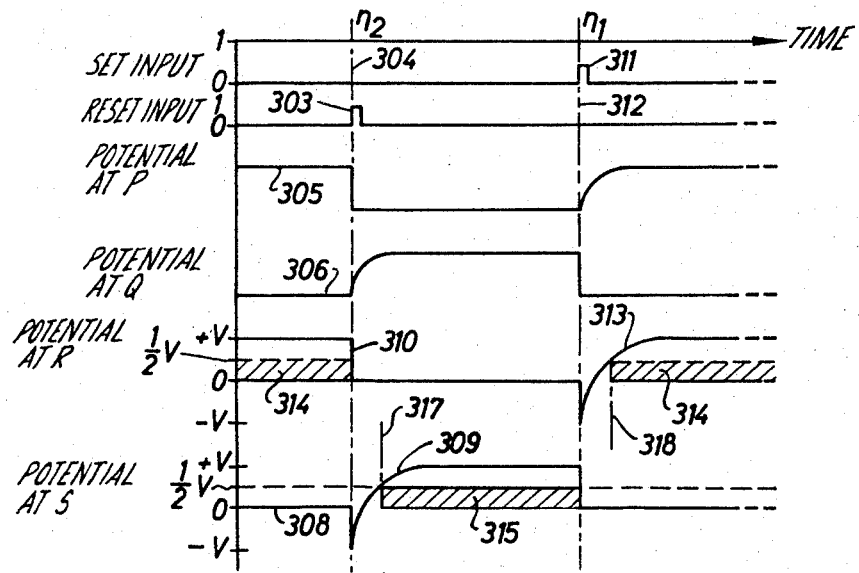
Figure 8A:
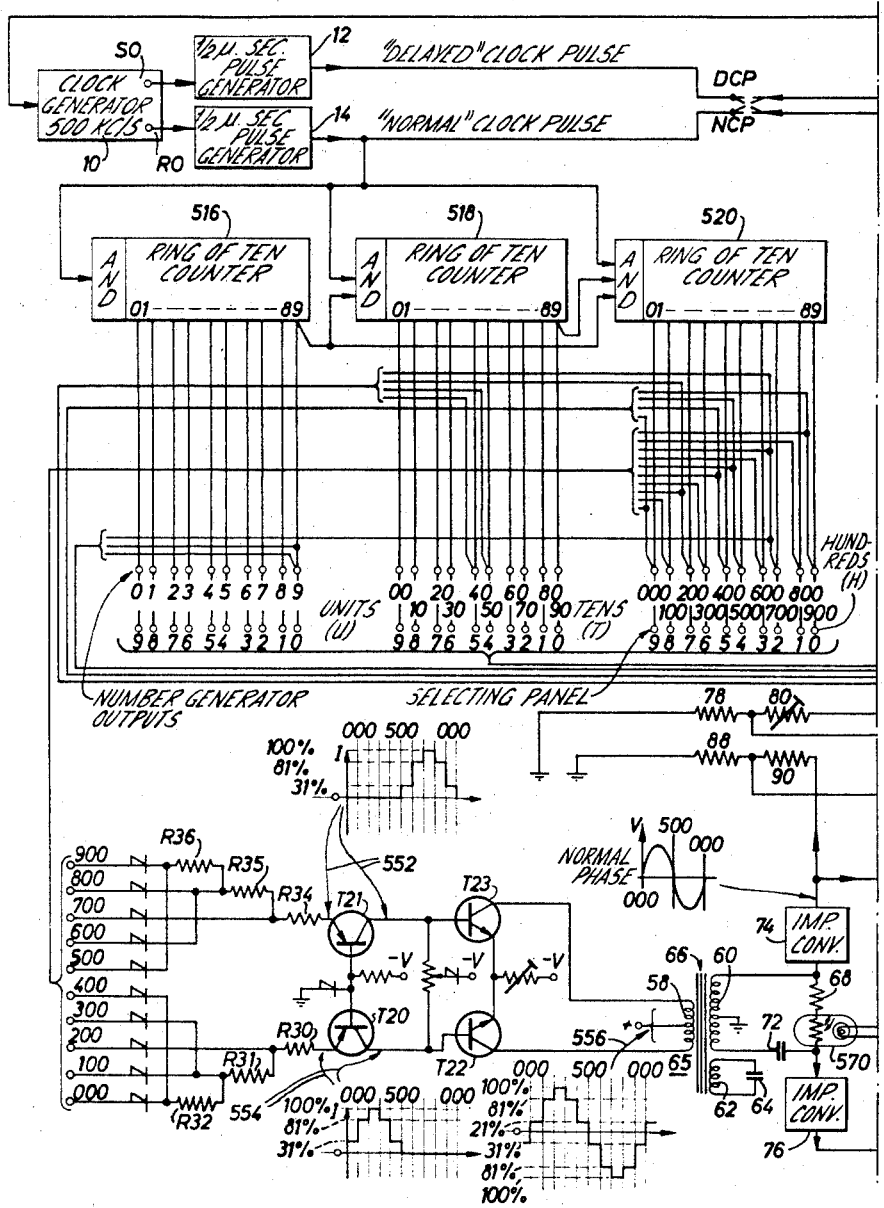
Figure 8B:
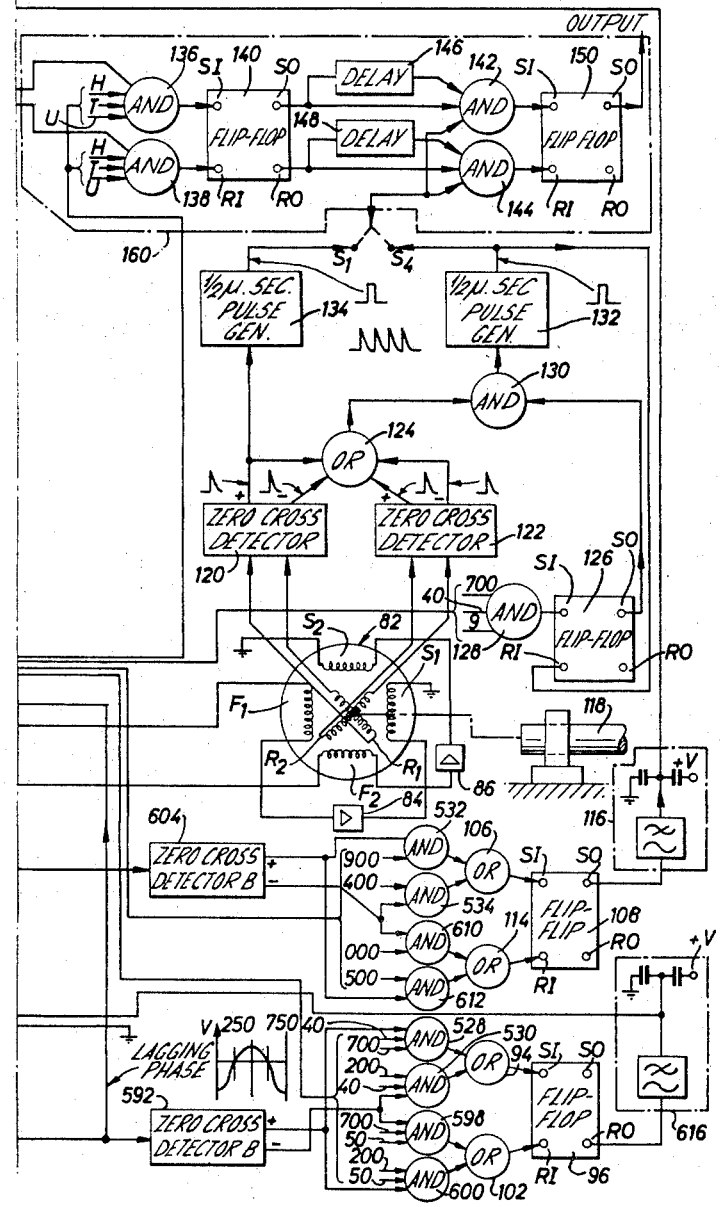
Figure 10:
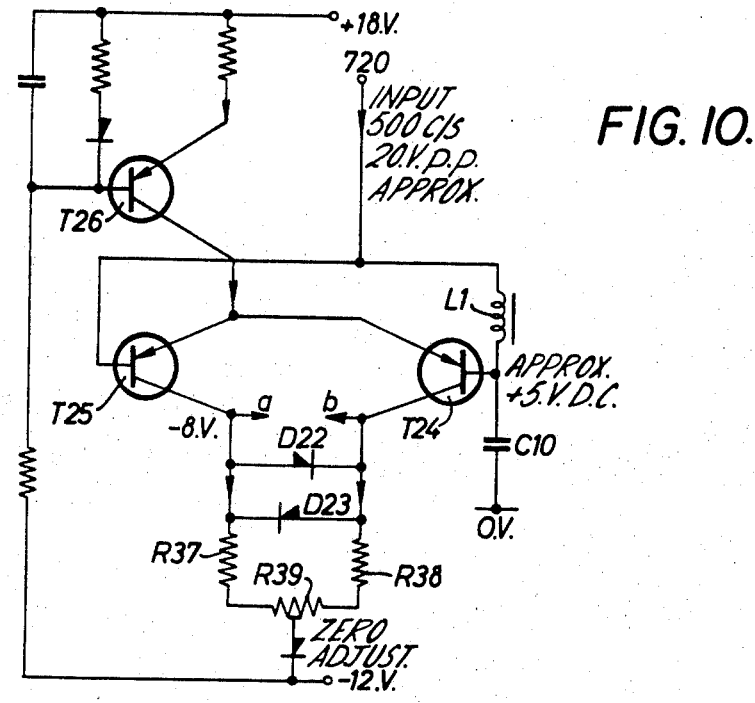
Figure 10A:
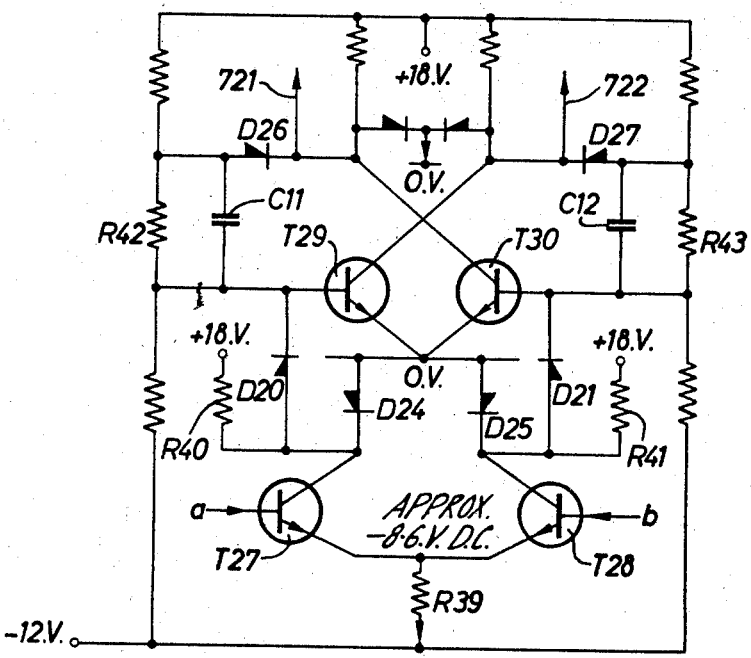
Figure 11:
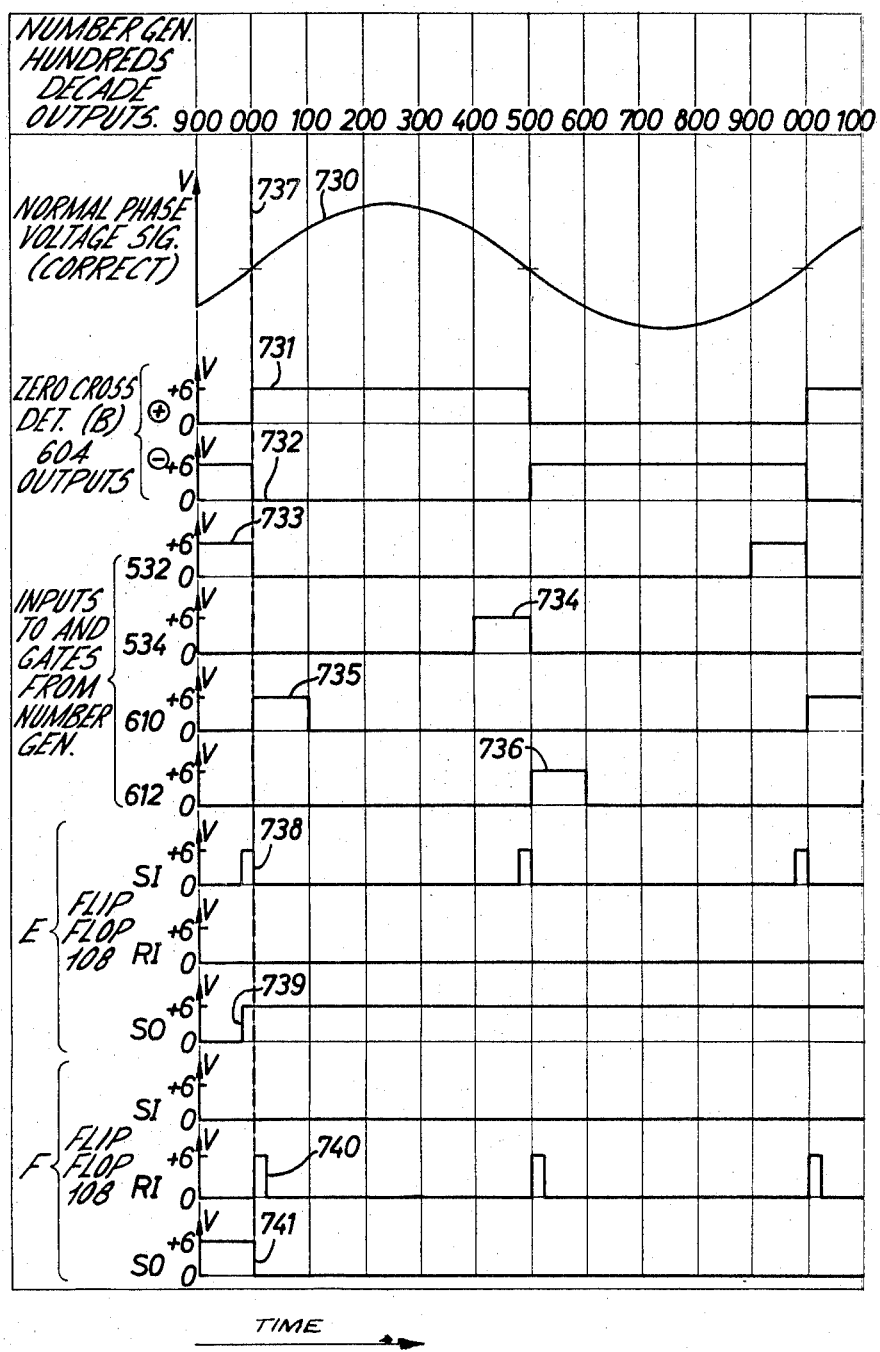
Figure 12A:
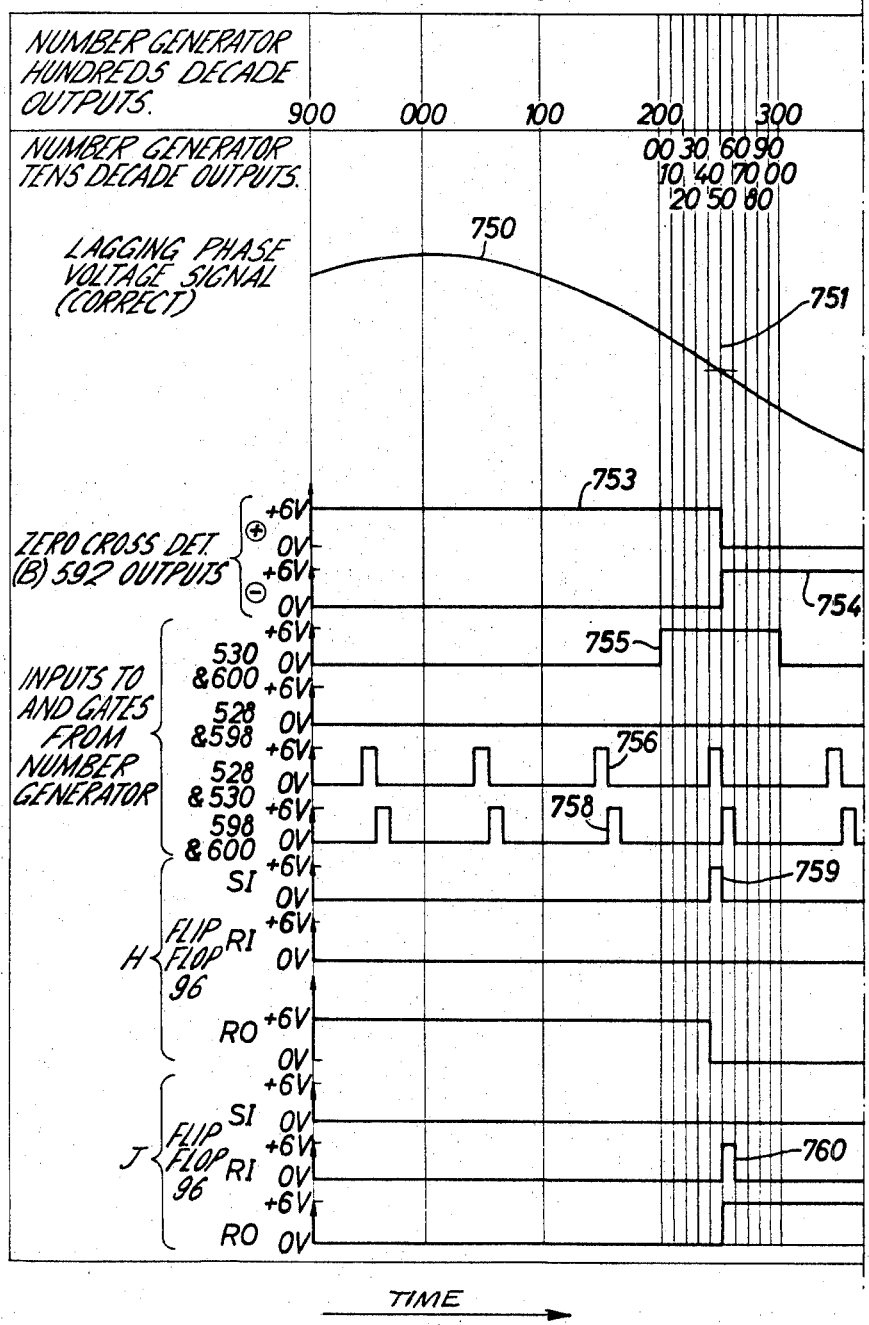

FIG. 3 is a timing diagram of certain operations illustrating the provision of back-lash in the arrangement of FIG. 1, FIG. 4 is a detail outline circuit diagram and FIG. 4a a timing diagram of an output unit suitable for use in the arrangement of FIG. 1 and incorporating provision for back-lash, FIG. 5 is a detail outline circuit diagram of a zero crossing detector suitable for use in the arrangement of FIG. 1, FIGS. 6 and 7 are outline circuit diagrams of two forms of bi-stable current sensing flip-flops suitable for use in the zero crossing detector of FIG. 5, FIG. 8 (a and b) is a block schematic diagram of a modified arrangement of position controlling switching means according to the present invention, FIG. 9 is a block diagram of a further zero crossing detector suitable for use in the arrangement of FIG. 8, FIGS. 10 and 10a are detail outline circuit diagrams of the zero crossing detector of FIG. 9, and FIGS. 11 and 12 (a and b) are timing diagrams illustrating certain wave forms and sequences of operations of the control circuit associated with control of the clock generator and in the circuit for promoting the desired phase relationship between the normal and lagging signals in the arangement of FIG. 8.

The arrangement illustrated in FIG. 1 is primarily intended to meet certain specific operating requirements. A series of output signals are to be provided when a shaft 118 is in preselected angular positions. The shaft 118 therefore constitutes the movable member, its given path is a rotary one. A transducer 82, which, as will be hereinafter described, may conveniently be a feedback resolver, has its rotor tightly coupled to the shaft 118 and its stator held stationary: if appropriate A.C. supplies are applied to energize its stator windings, a revolving magnetic field can be induced therein, and the phase relationship therewith of an A.C. signal induced in a rotor winding thereof will be dependent upon the angular position of the rotor with respect to the stator and thus of the shaft 118. The operational requirements are that the maximum speed of the shaft 118 is 30 revolutions per minute, that the angular position of the shaft with respect to the commencement and finish of any one output signal should have an accuracy of 1 part in 1,000 of one complete revolution and that the delay between the shaft reaching any given angular position and the commencement or finishing of a given output signal preselected to occur at that angular position should not exceed a range of 0 to 2 milliseconds. This latter requirement could be met if the relative angular position of the rotor of the transducer were determined 500 times per second; the accuracy requirement by dividing one revolution into 1,000 finite increments and both these were compatible with the speed of the shaft which at its maximum would move one increment in 2 milliseconds. The phase relationship between the transducer rotor winding A.C. signal and the A.C. signals applied to the stator windings is escertained by selecting a point in the cycle of the rotor A.C. signal, conveniently where it crosses zero in one direction, for example from negative to positive, and determining the point in the cycle of an A.C. signal applied to a stator winding at which it occurs, or more conveniently whether it occurs at a preselected point or within a preselected range of points of the stator winding signal cycle. To meet the foregoing requirements A.C. signals at a frequency of 500 cycles per second are applied to the stator windings and each cycle is effectively divided into 1,000 parts.

Additionally, the operational requirements were up to 12 output signals each to be available once during each revolution of the shaft 118 and up to 16 output signals each to occur four times during each revolution of the shaft 118, the four occurrences of each signal being substantially equi-angularly spaced.

Referring now to FIG. 1, a clock generator such as a free-running multi-vibrator 10 provides alternate set and reset output signals which are applied respectively to ½ microsecond pulse generators 12 and 14; in the drawings the references SO and RO are used to indicate set output and reset output respectively. The output of the generator 14 provides a normal clock pulse (NCP) signal and the output of the other 12 provides a delayed clock pulse (DCP) signal.

The normal clock pulses from the pulse generator 14 drives a three decade decimal counter comprising three binary coded decimal counters 16, 18, 20 and three diode matrices 22, 24, 26. Each one of these matrices 22, 24, 26 is associated with and responsive to the output of one of the counters 16, 18, 20.

The outputs of the diode matrix 22 corresponds to the units (1, 2, 3, 4 etc.) and those of the diode matrix 24 to the tens (10, 20, 30, 40 etc.) and those of the diode matrix 26 to the hundreds (100, 200, 300 . . . 900). By combining three such outputs, one from each matrix, a signal corresponding to any number between 000 and 999 can be obtained. The outputs are all brought out on to a connecting panel or similar arrangement (not shown).

In order to avoid any undesirable and inherent delay which might arise in the operation of the counters 16, 18 and 20, it is necessary that all transitions of the counters should occur substantialy simultaneously. The so-called ripple counters would not meet this requirement and the counters must each be a synchronous or coherent counter. As will hereinafter be observed a large number of signals may be derived from the outputs of the diode matrices 22, 24, 26 and whilst the counters might suffice and provide sufficiently great output signals if the number of signals withdrawn from the diode matrices were small, the output signals from the counters are preferably applied to emitter followers (not illustrated) and the resultant output signals from the emitter followers applied to the diode matrices, the emitter followers being capable of suplying large enough output currents.

Appropriate pulses are utilized to drive a sine wave generator indicated generally at 65. The output terminals which correspond to the numbers 100, 60 and 7 are electrically connected to an AND-gate 28 and the output terminals corresponding to the numbers 600, 60 and 7 to another AND-gate 30. In a similar manner, the output terminals corresponding to the numbers 300, 30 and 3 are connected to an AND-gate 32 and the output terminals corresponding to 800, 30 and 3 to an AND-gate 34. The outputs of the AND-gates 28 and 30 are connected to an OR-gate 36 and the outputs from the AND-gates 32, 34 are connected to an OR-gate 38. The outputs from these two OR-gates 36, 38 provide setting and resetting pulses for a flip-flop 44. In the drawings the references SI and RI are used to denote set and reset inputs repectively.

Furthermore, the output terminals corresponding to 000, 00 and 0 are connected to an AND-gate 40 and the output terminals corresponding to the numbers 500, 00 and 0 are applied to an AND-gate 42. The outputs of these two AND-gates 40, 42 are connected to the set and reset inputs of a further flip-flop, 46. The flip-flop 44 provides two output signals, one corresponding to a set condition and the other to a reset condition of said flip-flop switch 44. The reset output from the flip-flop 44 provides base bias for a transistor 48 and in a similar manner the set and reset outputs of the flip-flop 46 provide base bias for two transistors 50 and 52. These transistors are arranged in a gating circuit which controls a direct current flowing through centre tapped primary winding 58 of a transformer generaly designated 66. Inserts 54 and 56 in the accompanying drawings illustrate graphically the current wave forms at two points of this transistorized gating circuit. It will be seen that the current wave-form illustrated in insert 56 corresponds very approximately to the general shape of a sine wave and this current represents the algebraic summation of the collector outputs of the transistors 50 and 52 which excites the primary winding 58 of the transformer generally designated 66. One secondary winding 62 on this transformer 66 is tuned by a capacitor 64 to form a high-Q tank circuit having a natural resonant frequency of substantially 500 o./s.

A further centre-tapped secondary winding 60 of the transformer 66 is provided so that two signals of opposite phase may thereby be obtained from this single secondary winding. The two said anti-phase signals are applied to a resistance capacitance combination comprising a resistor 68, thermistor 70 and capacitor 72. A normal phase sine-wave signal is withdrawn from one end of the secondary winding 60 and a lagging phase sine wave signal from the common connection between capacitor 72 and thermistor 70. By selecting the parameters of the resistor 68, the thermistor 70 and the capacitor 72, it is possible to obtain two sine wave signals differing in phase by substantially 90°. In order to avoid loading this circuit the signals are fed to two impedance converters 74, 76, conveniently in the form of unity gain feed-back amplifiers: the output from the impedance converter 76 is applied through a trimming resistor potential divider 78, 80 to one stator winding system of the transducer 82 and the output from the impedance converter 74 is applied through a trimming resistor potential divider 88, 90 to another stator winding system of the transducer 82.

Each stator winding system of the transducer 82 comprises a feed-back winding F1 or F2 and a stator winding S1 or S2 and the systems are arranged geometrically at 90° to one another.

By feeding the normal and lagging phase signals drawn from the potential dividers 78 and 80, 88 and 90 through feed-back windings F1, F2, to the inputs of amplifiers 84, 86 respectively and feeding the outputs of these amplifiers to the stator windings S1, S2 respectively, it is possible for variations arising due to the iron circuits in the transducer 82 to be compensated for, so that a fairly accurate approach to a true sinusoidal rotating field can be obtained, provided that the normal phase and the lagging phase signals are substantially exactly 90° out of phase. The transducer 82 takes the form of a commerically available feed-back resolver and a suitable one is, for example, that manufactured by Muirhead & Co., Ltd., of Beckenham, Kent, under the designation Type 23, RSF 4.

The thermistor 70 is included in the RC circuit to enable the desired phase relationship betwen the normal and lagging signals to be maintained as accurately as possible. The lagging phase signal from the impedance converter 76 is fed to a zero crossing detector 92 which provides an output whenever the signal from the impedance converter 76 changes polarity and passes through zero. The zero crossing detector 92 differentiates between a change in polarity from negative to positive and a change in polarity from positive to negative and provides one output (indicated for convenience by the plus sign) when the polarity changes from negative to positive, and another (indicated for convenience by the minus sign) when the polarity changes from positive to negative. Both outputs from this zero crossing detector 92 are applied through an OR-gate 94 to the set input of a flip-flop 96. Output signals from the diode matrices 22, 24, 26 corresponding to the numbers 200, 50 and 0, are electrically connected to an AND-gate 98, and those corresponding to the numbers 700, 50 and 0 to a further AND-gate 100. The outputs from these AND-gates 98 and 100 are applied through an OR-gate 102 to the reset input of the flip-flop 96. The output of the OR-gate 102 corresponds to two signals occurring at the 250 and 750 points of the 000 to 999 scan of a cycle of the normal sine wave signal, and these two points are those at which the lagging sine wave signal should cross zero. If the two outputs from the OR gates 94 and 102 coincide exactly in phase, the flip-flop 96 receives set and reset input pulses simultaneously, and under these circumstances the flip-flop will be left at random either in the set or reset condition, though over a period of time it will be found to have been left an equal number of times in the set condition as in the reset condition. A signal is drawn from the set output of flip-flop 96 and applied to the thermal element of the thermistor 70. If the potential of the set output of the flip-flop 96 is zero when in the reset condition and V volts when in the set condition, then if both the set and reset pulses to the flip-flop 96 occur simultaneously, on a time average ½V volts will be applied to the thermal element of the thermistor 70. Should a phase difference exist between the set and reset input pulses, then flip-flop 96 will be left in the set and reset conditions for different periods of time and the time average signal on the set output will be greater or lower than ½V according to the direction of phase difference, so that the resultant alteration in the effective resistance of thermistor 70 is such as to restore the desired 90° phase relationship between normal phase and lagging phase signals.

The tank circuit formed by secondary winding 62 and capacitor 64 is also used to control the repetition frequency of the clock generator 10 and to this end a control circuit compares the normal phase sine wave signals derived from the impedance converter 74 with appropriate output signals from the diode matrices 22, 24, 26. The control circuit comprises a zero crossing detector 104 responsive to the output from the impedance converter 74 and which produces output signals which correspond to zeros of the sine wave signal appearing in the output of the impedance converter 74. Both these signals are applied through an OR-gate 106 to set input of a flip-flop 108. Output signals from the diode matrices 22, 24, 26 corresponding to the numbers 000, 00 and 0 are connected to an AND-gate 110 and those corresponding to the numbers 500, 00 and 0 to a further AND-gate 112; the outputs from these two AND-gates 110 and 112 are applied through an OR-gate 114 to the reset input of the flip-flop 108. A signal from the set output of the flip-flop 108 is applied through a low-pass filter 116 to the clock generator 10 as a repetition frequency control signal. If the set and reset input signals to flip-flop 108 occur simultaneously, the flip-flop 108 will be left at random in a set or reset condition and on a time average will have been left approximately equally in both conditions so that the signal emergent from the filter 116 will be approximately half that obtaining at the output of the flip-flop and such a signal will be indicative that the correct frequency relationship obtained. If a phase difference occurs between the set and reset inputs to flip-flop 108, the resultant signal applied to the clock generator 10 will be greater or less than such average and any necessary correction of the repetition frequency will be effected in the clock generator.

The rotor of the transducer 82 is provided with two rotor windings designated R1 and R2 which have their magnetic axes substantially at 90° to one another. Rotation of the movable member 118 causes rotation of the rotor and consequently of the rotor winding R1 and R2 in relation to the stator windings, so that the phase of A.C. signals induced in the rotor windings alters with respect to the phase of the stator windings. The two rotor windings R1, R2 are electrically connected to the inputs of two zero crossing detectors 120 and 122, each of which produces two output pulses both corresponding to zero points of the E.M.F.'s induced in the associated rotor winding, one corresponding to a crossing from negative to positive (indicated by the plus sign) and the other corresponding to a crossing from positive to negative (indicated by the minus sign). The plus output of the zero crossing detector 120 is applied to a pulse generator 134 which delivers a ½ microsecond strobe pulse designated S1.

Each of the outputs of the two zero crossing detectors 120, 122 will occur once in each cycle of the A.C. signals induced in the rotor windings. If the shaft 118 is stationary, this frequency will be the same as the frequency of the A.C. signals applied to the stator windings i.e. in the embodiment described 500 cycles, though this frequency will differ slightly by a slip frequency when the shaft 118 is rotating, but this difference will be immaterial in view of the relatively slow maximum speed of the shaft 118 as compared to the frequency of the A.C. signals applied to the stator windings. Since a complete cycle of the number generator from 000 to 999 represents one cycle of the A.C. signals applied to the stator windings, the point in a scan of 000 to 999 at which one particular output signal of the zero crossing detectors 120, 122 occurs, will indicate the angular position of the shaft 118. Since, in the arrangement described, each of the output signals is required to exist when the angular position of the shaft lies within a preselected range of positions, selected output signals from the diode matrices 22, 24, 26 can be used to set and reset a pulse gating circuit to pass a selected one of the output signals from the zero crossing detectors 120, 122 only if that signal occurs whilst the pulse gating circuit is in the set condition. One form of output circuit for achieving this is indicated within the broken rectangle 160 in FIG. 1 and comprises a flip-flop 140 which, in conjunction with AND-gates 142, 144 and delay means 146, 148, acts as a pulse gating circuit and serves to control the possible setting and resetting of an output flip-flop 150 to provide a desired output signal.

For reasons to be hereinafter described in connection with the provision of backlash, it is convenient for the output signals of the diode matrices to be extended to a selecting panel on which they are oppositely numbered. The selecting panel includes three ten-terminal sections, one corresponding to units, one to tens and the other to hundreds, and each such terminal is designated with the 9's-complement of its diode matrix output terminal. Output signals from the diode matrices 22, 24, 26, corresponding to the hundreds, tens and units, denoting the angular position of the shaft 118 at which a particular output signal is to commence, are picked up from the selecting panel terminals as numbered thereon and are applied to the three inputs of AND-gate 136 to provide a set input pulse to flip-flop 140 whilst those corresponding to the angular position at which such signal is to cease, are likewise drawn from the correspondingly numbered terminals of the selecting panel and applied through AND-gate 138 to the reset input of the flip-flop 140. During any one cycle, therefore, the flip-flop 140 will receive a reset signal at the finishing point and subsequently receive a set input signal at the commencing point but in the particular form of the AND-gates 142, 144 and delay means 146, 148, the effect of this becomes reversed.

It will be noted that provision is made for a fourth input signal to each of the gates 136, 138: such input signal can be either the NCP pulse or the DCP pulse. If it is the NCP pulse the setting or resetting of the flip-flop 140 will occur in time simultaneously with the clock pulse which sets up the preselected number on the selecting panel. On the other hand if the DCP pulse is used the flip-flop will be set or reset substantially midway in time between the setting up of the preselected number and the next number thereto on the selecting panel. In this way it is possible for either or both of the points preselected for the starting and finishing of an output signal to become effectively preselected by half-increments of angular position of the shaft 118 or by whole increments.

When flip-flop 140 is set, AND-gate 142 is conditioned to pass a strobe pulse so that if a strobe pulse S1 or S4 now occurs it will be passed to the set input of an output flip-flop 150 from which an output signal can be taken from its set output. Once the flip-flop 150 is set it will remain set until a next pulse is received on the reset input. So long as the shaft 118 remains within the range of angular positions corresponding to the preselected numbers on the selecting panel, with each scan of the numbers 000 to 999 the same strobe pulse will occur when AND-gate 142 is conditioned to pass it so that the flip-flop 150 will receive a set input pulse during each scan and will remain in the set condition. As soon as the shaft 118 has moved to an angular position which lies outside the preselected numbers, the strobe pulse will not coincide with the AND-gate 142 being conditioned to pass a pulse, but rather with the AND-gate 144 being conditioned to pass a pulse. The same strobe pulse will, therefore, be applied as a reset input to the flip-flop 150 to change it into the reset condition and thus cease the output. The flip-flop 150 will remain in the reset condition until it receives a set input and in fact during each scan of the numbers 000 to 999 will receive a reset input pulse with every strobe pulse.

The sequence of operations of various parts of the apparatus can probably be best described with reference to FIG. 2 which shows the waveform of certain signals and the condition of certain flip-flops against a time axis based on the number generator. One complete cycle of the number generator from 000 through 999 forms a horizontal axis. In electrical terms 250 on the number generator represents 90°, 500 represents 180°, 750 represents 270°. The normal phase signal applied to the windings F1 and S1 of the transducer 82 is illustrated at 170 and is in phase with the number generator cycle having zero potential at 000 and 500, a positive maximum at 250 and a negative maximum at 750. The lagging phase signal applied to the windings F2 and S2 of the transducer 82 is illustrated by the broken line 171. This has zero potential at 250 and 750, a positive maximum at 500 and a negative maximum at 000. For the purpose of illustration it is assumed that the shaft 118 is in an angular position of 135 electrical degree and corresponds to 375 increments of the number generator and under these circumstances the signals induced in rotor coil R1 of the transducer 82 leads the normal phase signal 170 by 375 units on the number generator scale. The signal induced in rotor winding R1 is illustrated at 172 and it will be observed that this has a zero value at 125 and 625, a negative maximum at 375 and a positive maximum at 875. The signal induced in the rotor winding R2 is illustrated by the broken line 173 and since the two rotor windings are electrically at 90° to one another, the signal in winding R2 lags 250 number generator increments behind the signal induced in winding R1. The zero crossing detector 120 provides a plus output signal when the signal induced in winding R1 crosses zero from negative to positive, i.e. at 625 on the number generator scale and such a plus output signal is illustrated at 174, and also a minus output signal as illustrated at 175 when the same signal crosses zero in a direction from positive to negative, i.e. at 125 on the number generator scale; the zero crossing detector 122 responds to the signal induced in the rotor winding R2 and in like manner provides a plus signal 176 at 875 and a minus signal 177 at 375. Pulse generator 134 responds to a plus output signal from the zero crossing detector 120 and thus provides an S1 strobe pulse 178 of half microsecond duration at 625 on the number generator scale.

Figure 2:
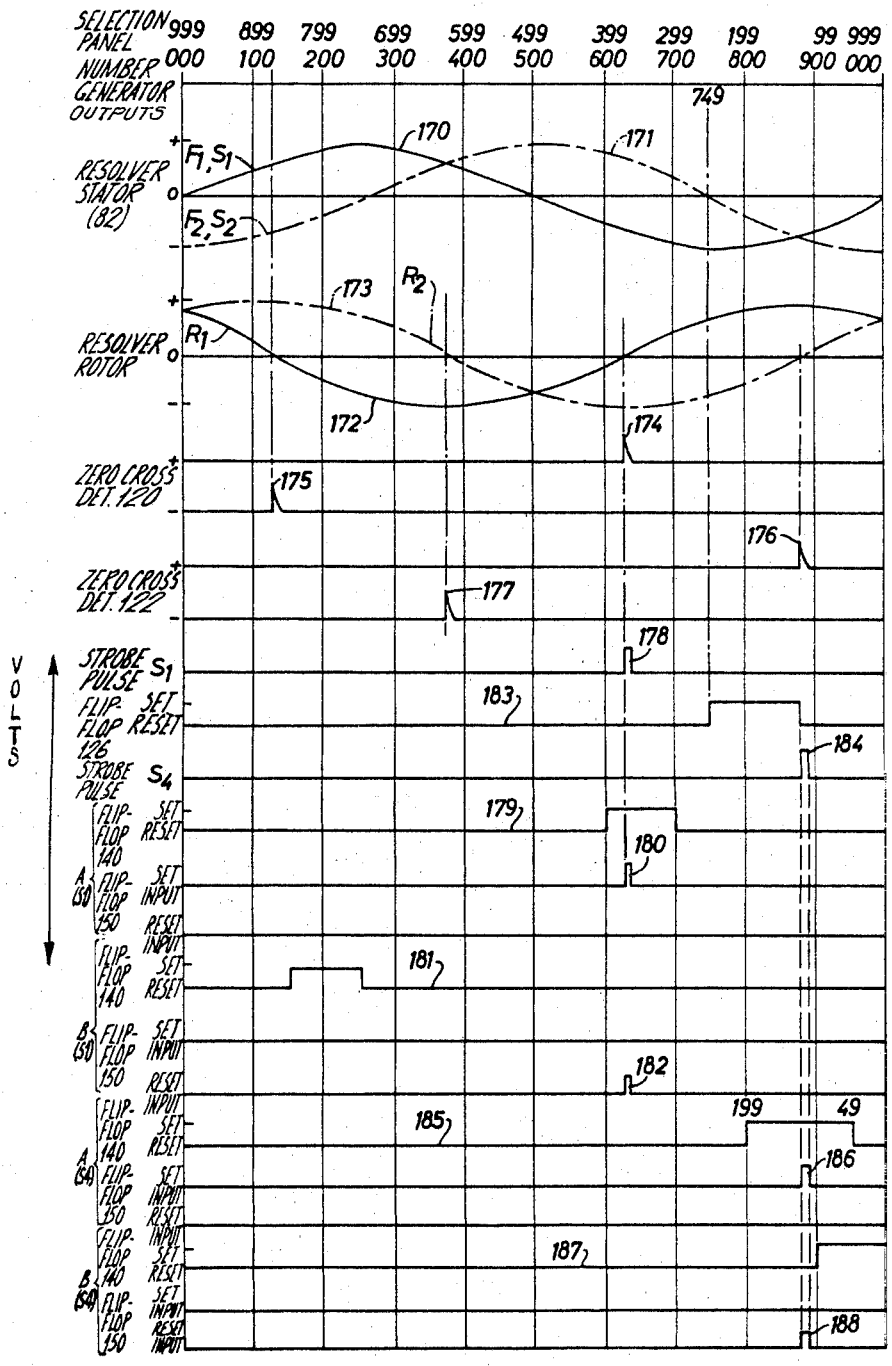
FIG. 2 is a timing diagram illustrating certain wave forms and certain sequences of operation in the arrangement of FIG. 1.

Two sets of conditions of the flip-flop 140 are illustrated in FIG. 2. One set identified by the designations A and S1 at the lefthand side illustrates the conditions when the flip-flop 140 is set at the time when the strobe pulse S1 occurs. The condition of flip-flop 140 is illustrated by the line 179 and for the purpose of illustration it is assumed to be set at 600 and reset at 700, thus when the S1 pulse 178 occurs, AND-gate 142 will be conditioned and the S1 pulse will pass as a set input pulse 180 to the flip-flop 150 which will then become set and provide an output signal. This same procedure will be repeated during each scan of the number generator so long as the S1 pulse occurs during the period in which the flip-flop 140 is in the set condition when the S1 pulse occurs. Therefore whenever the shaft position lies in the range 600–700, the flip-flop 150 will be set. Similarly when the shaft position lies without this range the flip-flop 150 will be reset.

The second set of conditions identified by the designations B and S1 at the lefthand side illustrates the conditions when the flip-flop 140 is in the reset condition when the strobe pulse S1 occurs. In this case for the purpose of illustration it is assumed that the flip-flop 140 has been preselected to be set at 150, reset at 250. The condition of the flip-flop 140 during a scan of the number generator is illustrated by the line 181. Under these conditions when the S1 pulse 178 occurs, the AND-gate 142 is closed and the AND-gate 144 conditioned to pass the pulse as a reset input pulse 182 to the flip-flop 150. Therefore whenever the shaft lies without the range 150–250 the flip-flop 150 remains reset but if the shaft position comes into the range 150–250, the flip-flop 150 will be set to give an output.

As referred to above, one of the operational requirements to be met by the illustrated embodiment is that in the case of certain output signals they were required to occur four times during each revolution of the shaft 118 at equi-angularly spaced intervals. Whilst it would be possible to provide additional AND-gates corresponding to the AND-gates 136 and 138, and to combine their output signals through OR-gates so that the flip-flop 140 can be set and reset any desired number of times during one scan of the number generator, as indeed would be necessary if a particular output signal was required to occur when the shaft 118 was in two or more unrelated ranges of angular position, a somewhat simplified arrangement can be obtained by selecting the angular range which lies in the first quadrant for the purpose of setting and resetting the flip-flop 140 and utilizing all of the output signals provided by both zero crossing detectors 120, 122, to provide a strobe pulse S4 which can occur only during the part of the number generator cycle corresponding to the first quadrant.

Since, for the purpose of providing back-lash as will be hereinafter explained, the selecting panel is numbered as the 9's-complement of the number generator output signals, the number generator signals 749 to 999 will correspond in terms of selecting panel numbers to the first quadrant of the shaft 118. The four output signals from the zero crossing detectors 120, 122 are passed through an OR-gate 124 to an AND-gate 130 which is conditioned from the set output of a flip-flop 126. Output signals from the diode matrices 22, 24, 26 corresponding to the number 700, 40, and 9, are combined in an AND-gate 128 applied to the set input of the flip-flop 126 so that during any scan of the number generator the flip-flop 126 becomes set at 749 to condition the AND-gate 130 to pass any output signal from the zero crossing detectors 120, 122. Any signal so passed is fed to a pulse generator 132 to generate a half microsecond strobe pulse which is designated S4. The S4 pulse is also applied to the reset input of the flip-flop 126 to reset it and thereby close the AND-gate 130, thus preventing the three unwanted output signals of the zero crossing detectors 120, 122 from affecting the flip-flop 150.

Referring once more to FIG. 2, the condition of the flip-flop 126 is illustrated by the line 183 during each scan of the number generator and this becomes set at 749 and remains in this condition until a signal is given by either of the zero crossing detectors 120, 122. The first signal to occur thereafter is a plus signal from the zero crossing detector 122 at 176. This signal is passed through AND-gate 130 to pulse generator 132 which delivers the S4 pulse 184; the S4 pulse resets flip-flop 126. Two sets of conditions of the flip-flop 140 in relation to the S4 pulse are also illustrated. One set identified by the designations A and S4 at the lefthand side illustrates the conditions when the flip-flop 140 is set at the time when the strobe pulse S4 occurs. The condition of flip-flop 140 is illustrated by the line 185 and for the purpose of illustration it is assumed to be reset at number selecting panel 050 and set at number selecting panel 199 corresponding to number generator outputs 949 and 800 respectively. Thus when the S4 pulse 184 occurs AND-gate 142 will be conditioned and the S4 pulse will pass as a set input pulse 186 to the flip-flop 150 which will then become set and provide an output signal. This same procedure will be repeated during each scan of the number generator so long as the S4 pulse occurs during the period in which the flip-flop 140 is in the set condition when the S4 pulse occurs. The second set of conditions identified by the designations B and S4 at the lefthand side illustrates the conditions when the flip-flop 140 is in the reset condition at the time when the strobe pulse S4 occurs. In this case for the purpose of illustration it is assumed that the flip-flop 140 has been preselected to be set at selecting panel 099 (number generator 900) and reset at selecting panel 999 (number generator 000). The condition of the flip-flop 140 during the scan of the number generator is illustrated by the line 187. Under these conditions when the S4 pulse 184 occurs, the AND-gate 142 is closed and the AND-gate 144 conditioned to pass the pulse as a reset input pulse 188 to the flip-flop 150.

If the operating conditions of the shaft 118 were such that it would be continuously rotating in the same direction at a varying speed it might not be necessary to provide for backlash but since the operational duties envisaged that the shaft 118 may be rotated intermittently and in either direction, it is desirable that some provision for backlash be made in order to avoid unnecessary and undesirable starting and stopping of output signals. Furthermore there is always the possibility that when a drive to the shaft 118 is stopped, play in mechanical transmission and even torsional elasticity of the shaft may result in some small dither being transmitted to the rotor of the transducer 82. Provision is included in the embodiment described to provide for backlash. The selecting panel terminals to which the necessary connections to the AND-gates 136, 138 of each of the output units 160 are numbered as the 9's-complement of the number generator outputs. The commencing point at which an output signal is desired is normally regarded as the lower number and the finishing point for that output as the higher number; as a result the starting point will be a lower number on the selecting panel and the finishing point the higher number. As the number generator cycle is scanned the number generator output corresponding to the finishing point will be reached first and the starting point second. Between the flip-flop 140 and the AND-gates 142, 144 delay devices 146, 148 are included. The effect of each of the delay devices 146, 148 is to introduce a short period of delay between a change of condition of the flip-flop 140 and the time when AND-gate 142 or 144 is conditioned to pass a strobe pulse. The effect of this delay means can best be described with reference to FIG. 3. For the sake of illustration a particular range for an output signal has been selected arbitrarily, namely on the selection panel scale for an output signal to commence at 550 and to terminate at 750. On the number generator scale the corresponding outputs would be 449 for the start and 249 for the finish. Since the selection panel terminals are numbered with the nines complement of the number generator outputs during a scan of the number generator the reset or finishing position will be reached first and the set or start position reached second. The set output of the flip-flop 140 is denoted by the line 190 and the reset output by the line 191. The condition of the flip-flop 140 will be changed from reset to set actually at the reset point indicated by the vertical line 192 and when the condition is so changed the delay means 146 does not condition the AND-gate 142 to pass a pulse immediately but only after a short delay or backlash time 193. In a similar manner the flip-flop 140 has its condition changed from set to reset at the set point indicated by the vertical line 194 and when the condition of the flip-flop 140 is so changed, the AND-gate 144 does not become conditioned to pass a strobe pulse until after a short delay period 195.

When the shaft 118 is rotating in a forward direction, in successive cycles, the strobe pulse will become earlier; in other words it will appear to move to the left as indicated by the arrow 196. As the shaft reaches the beginning of the range for which the output signal is required, the AND-gate 142 will already be conditioned so that as the strobe pulse reaches the vertical line 194 it will be passed through to the set input of the flip-flop 150. If, however, the shaft should stop at this point, and should rotate a very small amount in the reverse direction as might arise due to play in the transmission driving the shaft 118 or from torsional elasticity of that or any other shaft associated therewith, in the absence of any provision for backlash, the next or succeeding strobe pulse might find the AND-gate 142 closed and the AND-gate 144 conditioned so that it would pass as a reset input to the flip-flop 150. However, the effect of the delay means 148 is to create backlash time 195 so that even if the flip-flop 140 were reset at the time the next strobe pulse occurred, the AND-gate 144 would not have been conditioned to pass it and the flip-flop 150 would, therefore, remain in the set condition. Somewhat similar considerations apply also to the termination of the output signal. As the shaft continues forward rotation, the strobe pulse will come earlier in phase in each scan until it passes the vertical line 198. Up to the time that the strobe pulse reaches this point in a scan it will have been passed at each scan through to the set input of the flip-flop 150. When the strobe pulse occurs in the backlash period 193 between the vertical lines 198, 192, neither of the AND-gates will be conditioned but directly the strobe pulse goes to the left of the vertical line 192, the AND-gate 144 will be conditioned and it will be passed as a reset input to the flip-flop 150. If, when the shaft 118 reaches the angular position corresponding to the reset point 192 and a strobe pulse has been passed as a reset input to the flip-flop 150, the shaft 118 were to be stopped and even to rotate backwards through a very small angle, that is to say in the direction of the arrow 197, the next strobe pulse would not be passed by the AND-gate 142 so long as the strobe pulse lay within the backlash period 193. Thus the line 199 represents the total time in a cycle during which a strobe pulse can be passed as a set input to the flip-flop 150 and the line 200 represents the time during which a strobe pulse can be passed as a reset input to the flip-flop 150. It will, however, be noted that with the shaft 118 rotating in the forward direction, the start of the period in each cycle at which a strobe pulse can set flip-flop 150 coincides with the set position 194 and similarly with the point at which a strobe pulse can be passed to reset the flip-flop 150 coincides with the reset point 192. This follows primarily because the terminals of the selection panel are numbered in the reverse order as the 9's-complement of the number generator.

Part of one form of output unit suitable for use in the arrangement of FIG. 1 is illustrated in FIG. 4 to which reference will now be made.

Two transistors T1 and T2 act as the flip-flop 140 of FIG. 1 and two further transistors T3 and T4 serve as the output flip-flop 150. The set input to the flip-flop 140 is applied from AND-gate 138 to input lead 301 and is applied through a diode D1 to the base of the transistor T2. The reset signal from AND-gate 136 is applied to input lead 302 and is passed through diode D2 to the base of transistor T1. It will be remembered that on a basis of time the reset input is received first and the set input second in each scan of the generator. For the purposes of illustration let it be assumed that the set point is denoted by the number $n_1$ on the selection panel and the reset point by the number $n_2$. This implies that the output signal is to be present when the shaft 118 lies in any angular position between those corresponding to the selection panel numbers $n_2$ and $n_1$. During that part of a scan prior to reaching the position $n_2$, the flip-flop 140 will actually be in the set condition and in this condition transistor T1 is non-conducting and T2 conducting; the potential at point P, being the collector of transistor T1, is, therefore, high and the potential at point Q, being the collector of transistor T2, is low. On receipt of the reset input at $n_2$ transistor T1 becomes conducting and transistor T2 non-conducting. This corresponds to the reset condition. In the time diagram which forms part of FIG. 4 the reset input signal is indicated at 303 and coincides with the vertical line 304 denoting position $n_2$. The potentials at points P and Q are indicated by lines 305, 306.

The delay means 146 and 148 of FIG. 1 is in the form of a capacitor C1 connected between the collectors of the transistors T1 and T2 through diodes D3, D4. AND-gate 142 comprises diodes D5, D6 from which a signal is applied through diode D7 to the base of transistor T4. AND-gate 144 comprises diodes D8, D9, from which an output is applied through diode D10 to the base of transistor T3. Diodes D5 and D8 are connected to opposite sides of capacitor C1 and diodes D6 and D9 are connected to a strobe pulse input line 307. The bias potentials applied in the base circuits of the transistors T3 and T4 are such that when transistor T2 is conducting and transistor T1 non conducting, the potential appearing at point R is twice that necessary to enable a strobe pulse appearing at the line 307 to pass through the gate formed by diodes D8, D9 and become effective in the base circuit of the transistor T3 and similarly the potential existing at point S when transistor T2 is non-conducting and transistor T1 conducting, is twice that necessary to enable a strobe pulse on input line 307 to pass through the gate formed by diodes D5 and D6 and become effective in the base circuit of transistor T4.

On receipt of the reset input signal 303 transistor T1 is rendered conducting and transistor T2 non-conducting. The potential at point R follows that of point P and drops to zero. This change in potential at point R is reflected through capacitor C1 to point S. The potential across the capacitor C1 then alters exponentially so that the potential at point S rises from minus V to plus V. Such change of potential at point S is illustrated clearly at 309 whilst the change of potential at point R is illustrated at 310. On receipt of the set input pulse 311 which coincides with the vertical line 312 denoting positions $n_1$, similar considerations apply and the potential at point R changes instantaneously from zero to minus V and then rises exponentially to plus V as shown at 313. Since the required potential at point R or S for conditioning the AND-gates to pass strobe pulses is represented by ½V, the shaded areas 314 indicate those times when a strobe pulse will be passed to render transistor T2 conducting and transistor T4 non-conducting whilst the area 315 represents that time during which a strobe pulse can pass to the base of transistor T4 to render that conducting and the transistor T3 non-conducting. Conduction of transistor T4 and non-conduction of transistor T3 represents the set condition of the output flip-flop 150 and a positive output signal can be withdrawn on line 316 from the collector of transistor T3.

Referring to the timing diagram in FIG. 4a the periods of time denoted between the lines 304 and 317 and between lines 312 and 318 denote the backlash periods 193, 195 of FIG. 3.

One form of zero crossing detector suitable for use in the arrangement of FIG. 1 is illustrated diagrammatically in FIG. 5. A pair of transistors T5, T6, are connected as a long-tailed pair having a common emitter resistor R11 connected to a negative supply, and individual collector resistors R14, R15 connected to a positive supply. An A.C. signal whose zero crossing points are to be detected, and indicated diagrammatically at 201, is connected to the base of the transistors T5, T6. If the source 201 is symmetrical and has a centre tap, the centre tap can be connected to earth, but if it is asymmetrical one side only is connected to earth. Connected to the collector of each of the transistors are a pair of bistable current sensing flip-flops 202, 203. The input circuit of each of these flip-flops has a low impedance and each of them will change from one state to another when the current in its input circuit (denoted for example by the symbol $i$) in the case of the flip-flop 202 changes direction. When the input circuit current of flip-flop 202 changes from a negative to a positive direction, a step-like output signal as illustrated at 204, is generated at its output and is passed to a differentiating circuit formed by capacitor C2 and resistor R2 to form a positive going output pulse such as illustrated at 205. As in the case of the arrangement of FIG. 1, only a positive going pulse is required, this pulse is passed through a diode D11 which may form part of the zero crossing detector or may form part of an associated OR-gate (such as 94, 106, 124 in FIG. 1) to which the pulse is applied. When the input circuit current of the flip-flop 202 changes direction from a positive to a negative direction, a step-like output signal in the reverse direction will appear at the output of the flip-flop 202 and through this will be differentiated, it will not be passed through the diode D11 as it would be a negative going pulse. A feedback circuit within the flip-flop 202 provides that the current level at which such reverse change of state takes place occurs at a different magnitude of current in the input circuit. The flip-flop 202 and the differentiating circuits C2, R2, will provide a positive going output pulse at the time when the signal applied to the base of transistor T5 crosses zero from negative to positive and in order to provide a similar output pulse when the A.C. signal crosses zero in the reverse direction, the second flip-flop 203 provides a step-like output signal as illustrated at 206 when its input circuit current reverses direction from negative to positive as will occur when the potential applied to the base of transistors T6 crosses zero from negative to positive direction. The step-like output signal 206 is differentiated by capacitor C3 and resistor R3 and emerges as a positive going pulse through diode D12 as illustrated at 207. In the same manner as in the case of the flip-flop 202 the negative going step-like signal which occurs at the output of the flip-flop 203 when its input circuit current changes direction from positive to negative occurs at a different level of input circuit current and is suppressed by the diode D12.

A circuit diagram of one form of bi-stable current sensing flip-flop which is suitable for use at 202 or 203 in the zero crossing detector of FIG. 5 is illustrated in FIG. 6, and embodies two transistors T7 and T8. The emitters of both transistors are connected to an appropriate positive bias potential bias potential VA and the base of the transistor T7 is connected to the circuit in which the current is to be sensed, so that in the case of the bi-stable current sensing flip-flop 202 in the zero crossing detector of FIG. 5, this base is connected to the junction between the collector of the transistor T5 and resistor R14. The collector of transistor T7 is connected to the base of transistor T8 and to a negative supply $-V_C$ through resistor R17. The collector of transistor T8 is connected to the negative supply through a load resistor $R_L$ and to the base of transistor T7 through resistor R16 to provide for current feed back. An output signal can be withdrawn from the collector of transistor T8. A diode D13 is connected between the base of transistor T7 and earth.

A normal state obtains when $I_5=0$: the transistor T7 is rendered non-conducting by the current I flowing through resistor R14 and diode D13, and which is effectively equal to $$\frac{V_B-V_A}{R_{14}}$$

the transistor T8 is conducting, the output signal is the potential of the collector of transistor T8 and is substantially zero, and no feedback current $I_F$ flows through resistor R16. With $I_5$ increasing, when it has become just greater than a critical value equal to I, $$=\frac{V_B-V_A}{R_{14}}$$

transistor T7 begins to conduct, transistor T8 is rendered non-conducting. The potential of the collector of transistor T8 drops effectively to $-V_C$. This effect is reinforced by feed-back current $I_F$ through resistor R16 and this feed-back current will approach a value equal to $V_C/R_{16}$ provided that $R_L \ll R_{16}$.

With $I_5$ decreasing, the normal state will be regained when $I_5$ falls to a value equal to $I-I_F$ where $$I = \frac{V_B - V_A}{R_{14}}$$

and $I_F = V_C/R_{16}$. At this point the transistor T7 becomes non-conducting and the transistor T8 conducting so that a positive going output signal then appears at its collector. An operating requirement for this circuit is that $R_{16}/R_L < \beta_7 \beta_8$ where $\beta_7$ and $\beta_8$ denote the common emitter connection current gains of the transistor T7, T8 respectively. The relationship between the output potential and increasing and decreasing values $I_5$ is illustrated in the insert 210.

A circuit diagram of another form of bi-stable current sensing flip-flop suitable for use at 202 or 203 in the zero crossing detector of FIG. 5 is illustrated in FIG. 7 and embodies three transistors T9, T10, T11. The emitter-collector path of transistor T9 is included in the circuit in which the current is to be sensed. In the case of the current sensing flip-flop 202 of FIG. 5 the emitter of transistor T9 is connected to resistor R14 and the collector of transistor T9 to the collector of transistor T5. The base of transistor T9 is connected to the emitter of transistor T11, and the collector of transistor T9 is connected to zero potential or earth through a diode D14 and to the base of transistor T10. The collector of transistor T11 and the emitter of transistor T10 are both connected to VA and the collector of transistor T10, from which an output signal can be withdrawn, is connected to a negative supply $-V_C$ through a load resistor $R_L$ and to a positive supply $V_E$ through series connected resistor R18 and R19 where resistor R19 has resistance equal to twice that of resistor R18. The base of transistor T11 is connected to the junction of resistor R18 and R19 and a capacitor C4 is connected in parallel with resistors R18.

In a normal state such as obtains when $I_5 = 0$, transistor T9 is conducting, transistor T10 is held nonconducting by the current I flowing through resistor R14, transistor T9 and diode D14 and which is approximately equal to $$V_E - V_A/R_{14}$$

transistor T11 is conducting, and the output which is the potential of the collector of transistor T10 is $-V_C$.

With $I_5$ increasing, when it has become just greater than a critical value equal to I, $$= \frac{V_E - V_A}{R_{14}}$$

transistor T10 begins to conduct and the potential of its collector, and thus of the output signal, rises to zero, and the potential of the base of transistor T11 rises to approximately $$V_A + \left(\frac{V_E - V_A}{3}\right)$$

As a consequence the base and emitter of transistor T9 rise to approximately the same potential and the current through resistor R14 drops to approximately two thirds of its normal value, and the balance of current $I_5$ is diverted into the base of transistor T10. Thus a positive going output signal is delivered at a defined value of $I_5$. With $I_5$ decreasing, normal state is regained when it has dropped to a value approximately equal to two-thirds of I, i.e. at approximately $2(V_E - V_A)/3R_{14}$. The relationship between the output potential and increasing and decreasing values of $I_5$ is illustrated in the insert 220. The presence of the capacitor C4 in parallel with the resistor R18 serves to increase the speed of switching out of the back into normal state.

It will be apparent that with either of the circuits of FIGS. 6 and 7 either the positive going step or the negative going step after inversion can be used to generate the desired positive going output pulse and that the appropriate step will be selected in conjunction with the parameters of the components in the zero crossing detector of FIG. 5.

The form of zero crossing detector illustrated in FIG. 4 is to be understood as being by way of example only and the invention is not limited thereto. Another suitable form of zero crossing detector comprises, for example, a pair of transistors connected as a long-tailed pair with a common emitter resistor and a limiter connected across their collectors to amplify and square an A.C. signal fed to their bases. Output signals from the emitter circuits may be fed directly into a bi-stable flip-flop or through a further pair of transistors connected as a long-tailed pair to further amplify and square the signals. Step signals provided in the collector circuits of the flip-flop can then be differentiated and passed through diodes to provide positive going pulses in a similar manner to those provided by the arrangement illustrated in FIG. 4.

FIG. 8 is a block schematic diagram of a modification of the arrangement illustrated in FIG. 1. In place of the binary coded decimal counters 16, 18, 20 and associated diode matrices 22, 24, 26, three ring-of-ten counters can be used and the sine wave generator 65 can be driven by a five-step approximation to a half sine wave as compared with the three-step approximation of a half sine wave in the arrangement of FIG. 1. The control circuits for maintaining the phase relationship between the normal phase and lagging phase voltage signals from the sine wave generator 65 and for maintaining the desired repetition frequency of the clock generator 10 utilize different outputs from the number generator and both outputs from zero crossing detectors of a modified form to provide set and reset input signals to the flip-flops 96 and 108 as compared with the arrangement of FIG. 1. The arrangement of FIG. 8 also illustrates that a lamp and photo-resistor combination can be utilized in place of the thermistor 70 in the arrangement of FIG. 1. These modified arrangements are illustrated in the block diagram of FIG. 8 in which the transducer 82, zero crossing detectors 120 and 122, strobe pulse generators 132 and 134, and associate gates 124, 128, 130 and flip-flop 126, output circuit 160, as well as the clock generator 10 and the pulse generators 12 and 14 are the same as in the arrangement of FIG. 1. Like reference numerals are applied to those parts of FIG. 8 which are the same as corresponding parts in FIG. 1 and it is believed that their functioning will already be apparent from the foregoing description in connection with FIG. 1, without further reference thereto, and reference will only be made to those parts which are modified.

In the arrangement of FIG. 8 the binary-coded decimal counters and diode matrices of the arrangement of FIG. 1, are replaced by three-ring-of-ten counters 516, 518, 520. The counter 516 provides the units outputs 0 to 9, the counter 518, the tens outputs 00 to 90 and the counter 520 the hundreds outputs 000 to 900 identified as number generator outputs: these outputs are also extended to the selecting panel where, as in the arrangement of FIG. 1, they appear each identified as its 9's digit complement. The counters are driven by the normal clock pulse so that all transitions of the counters can occur substantially simultaneously.

All the output signals from the counter 520 which provides the hundreds outputs are utilized to drive the sine wave generator 65. The output terminals 000 to 400 of the hundreds number generator are applied to the emitter of a transistor T20 through diodes and resistors R30, R31 and R33 to give a five-step approximation to a half sine wave as illustrated in the inset 554. The outputs corresponding to the numbers 000 and 400 on the number generator scale are combined to provide an approximately 31% current signal. The outputs corresponding to the numbers 100 and 300 are combined to provide an approximately 81% current signal whilst the output corresponding to the number 200 provides a 100% current signal. In a similar manner the number generator output terminals corresponding to numbers 500 to 900 are connected through diodes and resistors R34, R35 and R36 to the emitter of a transistor T21 to provide a five-step approximation to a half sine wave as illustrated in the inset 552. Signals from the collectors of the transistors T20, T21 are amplified by transistors T22, T23 which control respectively the current through each of the two halves of the primary winding 58 of transformer 66 in the sine wave generator 65. The effective current through the primary winding 58 is illustrated in the inset 556 and it will be observed that this is effectively a ten-step approximation to a full sine wave and thus is a closer approximation than the six-step approximation illustrated in the inset 56 in FIG. 1.

The ten-step approximation virtually eliminates even, third and fifth harmonics whereas the six-step approximation only eliminated the even and third harmonics.

In the arrangement of FIG. 1, pulse output signals from the zero crossing detector 92 are used to produce a set input to the flip-flop 96 and output signals from the number generator corresponding to the numbers 700, 50 and 0 and 200, 50 and 0 are used to provide a reset input to the flip-flop 96 of which a reset output is used to control the thermistor 70 for maintaining the desired phase relationship between the lagging phase and normal phase voltage signals from the sine wave generator 66. If the reset output is denoted by a signal of voltage V and the adsence of a reset output signal by a zero voltage, then when the desired phase relationship obtains, the time average of a ½V volts will be applied to the thermal element of the thermistor 70. Whilst this arrangement is satisfactory when stable conditions have been established, when the phase relationship between the lagging and normal phase voltage signals differ widely from the desired relationship, for example immediately after initial switching on, the flip-flop 96 can receive widely separated set and reset input signals such that the time average of the reset output signal may well approach ½V volts and some time may elapse before the desired phase relationship becomes established. In the modified arrangement of FIG. 8 the set and reset input signals to the flip-flop 96 are derived differently such that the flip-flop 96 will either remain set or remain reset if the phase relationship is other than that desired but will be both set and reset on a time average an equal number of times when the desired phase relationship obtains. To this end a modified form of zero crossing detector (identified in FIG. 8 as zero crossing detector B) 592 is used. This zero crossing detector, which will be described later, provides two output signals which, for the sake of convenience, are designated plus and minus: the plus signal (indicated for convenience by the + sign in FIG. 8) substantially from the instant of the voltage signal crossing zero in the from negative to positive direction until the zero is subsequently crossed in the from positive to negative direction, and the minus output (indicated for convenience by the — sign in FIG. 8) substantially from the instant that the voltage signal crosses zero in the from positive to negative direction until it crosses zero again in the from negative to positive direction. Thus it can be said that the plus output exists during a positive half cycle and the minus output during a negative half cycle. The plus output is applied to an AND gate 528 to which are also electrically connected number generator outputs corresponding to the numbers 700 and 40, and also to an AND gate 600 to which are also electrically connected the number generator outputs corresponding to the numbers 200 and 50. The minus output of the zero crossing detector 592 is connected to an AND gate 530 to which are also electrically connected the number generator outputs corresponding to the numbers 200 and 40 and to an AND gate 598 to which are also electrically connected number generator outputs corresponding to the numbers 700 and 50. The outputs of the AND gates 528 and 530 are applied through OR gate 94 to the set input of the flip-flop 96 and the outputs of AND gates 598 and 600 are applied through OR gate 102 to the reset input of the flip-flop 96. The reset output of the flip-flop 96 is connected through a low pass filter 616 to the lamp element of a lamp photo-resistor combination 570 of which the photo-resistor is connected in series with the resistor 68 and the capacitor 72 across the secondary winding 60 of the transformer 66.

A somewhat similar arrangement is used to provide the control circuit for governing the repetition frequency of the clock generator 10. A second similar zero crossing detector B 604 provides plus and minus signals in respect of the normal phase voltage signal derived from the secondary winding 60 of the transformer 66. The plus output is applied to an AND gate 532 to which is also electrically connected number generator output corresponding to the number 900 and also to an AND gate 612 to which is also electrically connected the number generator output corresponding to the number 500. The minus output of zero crossing detector 604 is applied to an AND gate 534 to which is also electrically connected the number generator output corresponding to the number 400 and also to AND gate 610 to which is also electrically connected the number generator output corresponding to the number 000. The outputs from the AND gates 532 and 534 are applied to the set input of the flip-flop 108 through OR gate 106, and the outputs of the AND gates 610 and 612 are applied to the reset input of the flip-flop 108 through OR gate 114. If the repetition frequency of the clock generator 10 differs significantly from the desired frequency the flip-flop 108 will either be in the set condition or in the reset condition and when the repetition frequency is substantially equal to that desired the flip-flop 108 will, on a time average, be in the set condition and in the reset condition an equal number of times; thus the set output of the flip-flop 108 will either be 0 or V volts if the repetition frequency differs from that desired and will be effectively ½V volts on a time average when the frequency is substantially that desired.

One form of zero crossing detector B suitable for use at 592 and 604 in the arrangement of FIG. 8, is illustrated in block form in FIG. 9 and in outline circuit detail in FIG. 10. In essence the zero crossing detector comprises a differential amplifier 701 which controls a flip-flop 702; a reference signal is applied to one input 703 of the differential amplifier 701 and the voltage signal whose zero crossing points are to be detected is applied to the other input 704. The output of the differential amplifier 701 is limited by a shunt limiter 705 and applied to a second differential amplifier 706 whose output is similarly limited by a shunt limiter 707 and, through diodes D20, D21, provides set and reset inputs to the flip-flop 702. If, as in the case of the arrangement of FIG. 8, the input signal has a mean D.C. level other than zero, a low pass filter 700 serves to provide a mean level signal for use as a reference signal to be applied to the input 703. Wave forms of certain signals are illustrated diagrammatically in FIG. 9 on a common time axis; the line 710 indicates a signal waveform whose zero crossing points are to be detected. Such a signal can have a magnitude of about 20 volts peak to peak and a mean level other than zero. The incoming voltage signal is applied to the low pass filter 700 which delivers a reference signal corresponding to the mean level of the incoming signal with a slight A.C. wave superimposed, as indicated by the line 711. The differential amplifier 701 provides two outputs in opposite phase, each about a common level: such outputs are indicated by the lines 712, 713, the magnitude of the outputs being limited by the shunt limiter 705 to a suitable level such as about 1.4 volts peak to peak. It will be observed that the two outputs change around the point at which the applied input signal crosses its mean value which may or may not be zero. The outputs from the differential amplifier 701 are applied to the differential amplifier 706 which produces output signals of more nearly square shape, as indicated by lines 714, 715, and these output signals are used to provide set and reset inputs to the flip-flop 702 which delivers a plus output, indicated by line 716, corresponding to the set condition and a minus output, indicated by line 717, corresponding to the reset condition. It will be seen that the plus output is effectively present substantially during the positive directed half cycle and the minus output during the negative directed half cycle of the applied voltage 710 about its mean value.

A suitable circuit is indicated in FIGS. 10 and 10a. An inductor L1 and a capacitor C10 serve as low-pass filter 700 and by connecting the junction between one end of the inductor L1 and one side of the capacitor C10 to the base of the transistor T24, a reference signal approximating to the mean level of a sine wave input signal applied to the input 720 is applied to the base of the transistor T24 whilst the input signal is applied to the base of transistor T25. The emitters of the transistors T24 and T25 are connected together to the collector of transistor T26 functioning as a stabilizer circuit to provide a substantially constant emitter current to the transistor T24 and T25 together. When the voltage signal applied to the base of transistor T25 is more positive than that applied to the base of transistor T24, the collector current of transistor T25 is reduced so that the collector of transistor T25 becomes more negative and that of T24 more positive. The extent of the voltage excursions of the collectors is limited by diodes D22 and D23 to a suitable value such as about 1.4 volts peak to peak. The collectors of the transistors T24 and 25 are connected through resistors R37 and R38 and a potentiometer R39 to a source of negative potential, the potentiometer 39 serving to enable adjustment to be made for any variations in components. The output signals from the collectors of the transistors T24, T25 are applied to the bases of transistors T27, T28 which operate as the differential amplifier 706. The emitters are connected through a common resistor R39 to a source of negative potential and their collectors through separate resistors R40, R41 to a source of positive potential and also through diodes D24, D25, to a zero potential line. The diodes D24, D25 serve as shunt limiter 707 and limit the excursions of the collector potentials of the transistors T27 and T28. Signals from the collectors of the transistors T27 and T28 are applied through diodes D20, D21 to the bases of two further transistors T29, T30, whose collectors and bases are cross connected through diodes D26, D27, capacitors C11 and C12 and resistors R42 and R43 to form the flip-flop 702. The plus output can be drawn from the collector of transistor T30 on plus output line 721 and the minus output signal from the collector of transistor T29 on output line 722.

The manner in which the control circuits for maintaining the desired phase relationship between the normal phase and lagging phase voltage signals and for maintaining the desired phase relationship between the normal phase and lagging phase voltage signals and for maintaining the desired repetition frequency of the clock generator 10 can be best described with reference to the timing diagrams of FIGS. 11 and 12. The timing diagram of FIG. 11 relates to the control circuit for maintaining the desired repetition frequency of the clock generator 10 and embodies the zero crossing detector B 604, the AND gates 532, 534, 610 and 612, the OR gates 106, 114 and the flip-flop 108 and reference will be made to these first. The horizontal axis is a time axis expressed in terms of number generator cycles and a little more than one complete cycle of the number generator from 000 through 999 is illustrated. The normal phase voltage signal as applied to the input of the zero crossing detectors B 604 is illustrated at 730 under those conditions when it is correctly in phase with the number generator in that it crosses its mean or effective zero at 000, 500 and 000 on the time scale represented by the number generator. The plus output of the zero crossing detector 604 is illustrated by line 731 and the minus output by line 732. The number generator outputs which are connected to the inputs of the AND gates 532, 534, 610 and 612 are indicated respectively by lines 733, 734, 735 and 736. As the number generator output corresponding to the number 900 is connected to the AND gate 532, this gate will be conditioned throughout the period from the number 900 to the number 000 on the number generator cycle, and the AND gates 534, 610 and 612 will be similarly conditioned at different periods in the cycle. Two sets of conditions are illustrated in FIG. 11; one set identified by the designation E at the left-hand side illustrates the conditions when the normal phase voltage signal begins to lead in respect of the number generator cycle. The voltage 730 will cross its means or effective zero not at the point 000 on number generator scale as indicated by the vertical line 737, so that the plus output of the zero crossing detector 604 will commence before that line and will occur at a time when the gate 532 is conditioned. It will, therefore, pass through the OR gate 106 and appear as a set input to the flip-flop 108 as indicated at 738. The flip-flop 108 will, therefore, be set and deliver a set output as indicated by the line 739. The flip-flop will thereafter remain in the set condition and will continue to give a set output until it receives a reset input. So long as the phase of the normal phase voltage signal is leading with respect to the number generator cycle, the flip-flop 108 will receive set input signals each time the normal phase voltage signal crosses its mean or effective zero. A second set identified by the designation F at the left-hand side illustrates the conditions when the normal phase voltage signal begins to lag behind the number generator cycle. Under these conditions the normal phase voltage signal will cross its mean or effective zero after the line 737, i.e. between 000 and 100 on the number generator scale. The minus output signal of the zero crossing detector 604 will commence a little to the right of the line 737 at a time when the AND gate 610 is conditioned by the signal from the number generator output corresponding to the number 000 and will pass through the OR gate 114 to the flip-flop 108 as a reset input as indicated by the line 740: the flip-flop 108 will be reset and the set output cease as indicated at 741. The flip-flop 108 will continue in the reset conditions until it receives a set impulse and thus, so long as the normal phase voltage signal is lagging behind the number generator cycle, there will be no set output from it.

When the normal phase voltage signal is correctly in phase with the number generator, on a time average the flip-flop 108 will receive as many set input signals as reset input signals and, on a time average, give a set output of ½V volt. This arrangement has the advantage that by providing a correcting signal equal to V volts when the normal phase voltage signal is leading in relation to the number generator and an output signal of 0 volts when the normal phase voltage signal is lagging with respect to the number generator and give a time average mean output signal of ½V volts when the correct relationship obtains.

FIG. 12 is a similar timing diagram in respect of the control circuit for maintaining the desired phase relationship between the normal phase and lagging phase voltage signals. To this end the phase of the lagging phase voltage signal is compared with the cycles of the number generator. As in FIG. 11 the horizontal axis is one of time in terms of cycles of the number generator, a little more than one cycle of the number generator being illustrated. The lagging phase voltage signal, when in correct phase relationship with the number generator cycle is illustrated by the line 750 and it will be noted that it crosses its mean or effective zero at a vertical line 751 which corresponds to the number 250 on the number generator cycle, and at a vertical line 752 which corresponds to the number 750 on the number generator cycle. The plus output of the zero crossing detector B 592 is illustrated by line 753 and the minus output thereof by the line 754. With the lagging phase voltage signal in the correct relationship to the number generator cycle, the plus output commences at the line 752 corresponding to the number 750 and continues through to the line 751 of the next cycle of the number generator and the minus output signal commences at the line 751 corresponding to the number 250 in a cycle and continues up to the line 752 which corresponds to the number 750 in the same cycle of the number generator. The output signals from the number generator which are applied to condition the AND gates 528, 530, 598 and 600 are illustrated by the lines 757 and 756, 755 and 756, 757 and 758, 755 and 758 respectively. The combination of these output signals is such that the gate 528 is conditioned from 740 to 750, the gate 598 from 750 to 760, the gate 530 from 240 to 250 and the gate 600 from 250 to 260 of each number generator cycle. Two sets of conditions are illustrated in FIG. 12; one set identified by the designation H at the left-hand side, illustrates the conditions when the lagging phase voltage signal begins to lead behind the cycle of the number generator. The plus output of the zero crossing detector 592 will be present whilst the AND gate 528 is conditioned by the number generator outputs as indicated by the lines 757 and 756 and also whilst the AND gate 598 is conditioned by the number generator outputs represented by the lines 757 and 758. The plus output from the zero crossing detector 592 will be passed through OR gate 94 as a set input signal to the flip-flop 96 as indicated at 759 but no reset signal will be passed to the flip-flop. The flip-flop 96 will, therefore, be set and provide an 0 volt reset output: it will remain set until a reset input signal is applied to it. The second set identified by the reference J at the left-hand side illustrates the conditions which obtain if the lagging phase voltage signal begins to lag in relation to the number generator cycle. The minus output of the zero crossing detector 592 will commence whilst the AND gate 598 is conditioned and will pass through the OR gate 102 as a reset input signal to the flip-flop 96 is indicated by the line 760. The flip-flop 96 will now be reset and a reset output signal of V volts will continue to be given until a set input signal is received. Similar considerations will apply in respect of the AND gates 530 and 600. It will be seen that the flip-flop 96 either provides a reset output either equal to V volts or equal to 0 volts if the phase of the lagging phase voltage signal is not as desired, but will give a time average output equal to ½V volts if the desired phase relationship obtains as, under those conditions, the flip-flop 96 will on a time average be in the set and reset conditions an equal number of times.

In the arrangements illustrated in FIGS. 1 and 8, a transducer 82 in the form of a feedback resolver is employed for detecting the angular position of the shaft 118 but it is to be understood that this is by way of illustration and that the invention is not limited only to the use of a feedback resolver. Other devices for sensing the angular position of the shaft 118 may be employed such as photo-optical systems including one or more coded discs.

If the path of the movable member is other than circular, more especially if it is linear, a linear resolver may be used. By way of example, one suitable form of linear resolver available commercially is manufactured by Farrand Optical Co., Inc. of New York, N.Y., U.S.A., and is marked under the name Linear Inductosyn.

Amongst the advantages which may be obtained from the arrangements disclosed in FIG. 1 and in FIG. 8, is that the angular position of the shaft 118 is sensed with each cycle or scan of the number generator from 000 to 999 and in the arrangement described this takes place at a rate of 500 cycles per second. This is of particular advantage if the electricity supply to the control circuits may at any time be interrupted, for example if any adjustment or servicing of equipment associated with shaft 118 should be in progress. Within an extremely short time after restoration of such supply the precise angular position of the shaft 118 will have been detected and all appropriate output signals will be available. Such an arrangement would not be readily available if trigger circuits were employed for initiating output signals as in many cases a complete revolution of the shaft 118 would be required in order to ensure that the correct output signals were present. The arrangements illustrated in FIG. 1 and in FIG. 8 may readily be extended by the provision of one or more coincidence circuits responsive to a positive going signal from one or other of the outputs of the zero crossing detectors 120, 122 and predetermined signals drawn either from the number generator outputs or from the selecting panel to provide output signals to one or a series of pilot lights for giving visual indication of one or a series of predetermined angular positions of the shaft 118.

The term "flip-flop" as used in the specification and claims is to be understood as referring to a bi-stable multivibrator which is stable in both conditions and which, on receiving a set input signal, changes into a set condition and delivers a set output and remains stable in that condition until it receives a reset input signal, whereupon it changes to the reset condition and delivers a reset output and that it remains in that condition until a subsequently set input signal is received.

I claim:

1. A position responsive switching system for providing at least one output signal corresponding to a predetermined position of a movable member along a given path, comprising
cyclically operable number generating means having a number range corresponding substantially to the total range of movement of the movable member along the given path for providing a succession of output signals each corresponding to a particular position of the movable member within the total range of movement along the given path,
strobe pulse generating means associated with the movable member for generating with each cycle of the number generating means a pulse, the phase of which relatively to a cycle of the number generating means is indicative of the instantaneous position of the movable member along the given path,
gating means responsive to a preselected signal from the number generating means corresponding to said predetermined position of the movable member for passing a strobe pulse to provide an output signal only when the movable member is at said predetermined position.

2. A position responsive switching system for providing at least one output signal corresponding to a predetermined range of positions of a movable member along a given path, comprising
cyclically operable number generating means having a number range corresponding substantially to the total range of movement of the movable member along the given path for providing a succession of output signals each corresponding to a particular position of the movable member within the total range of movement along the given path,
strobe pulse generating means associated with the movable member for generating with each cycle of the number generating means a pulse, the phase of which relatively to a cycle of the number generating means is indicative of the instantaneous position of the movable member along the given path, gating means responsive to preselected signals from the number generating means corresponding to said predetermined positions of the movable member for passing a strobe pulse to provide an output signal only when this movable member is in said predetermined range of positions.

3. A position responsive switching system for providing at least one output signal corresponding to a predetermined range of positions of a movable member along a given path, comprising cyclically operable number generating means having a total number range corresponding substantially to the total range of movement of the movable member along said given path for providing a succession of output signals each corresponding to a particular position of the movable member within the total range of movement along said given path, strobe pulse generating means associated with the movable member for generating with each cycle of the number generating means a pulse, the phase of which relatively to that cycle of the number generating means, is indicative of the instantaneous position of the movable member along said given path, at least one output circuit each comprising gating means and bi-stable switching means, said gating means being responsive to preselected signals from the number generating means corresponding to said predetermined range of positions of the movable member for passing a strobe pulse to said switching means as a set signal only when the movable member is in said predetermined range of positions and for passing a strobe pulse to said switching means as a reset signal when the movable member is without said predetermined range of positions, said switching means commencing an output signal upon receiving a set signal and discontinuing such output signal upon receiving a reset signal.

4. A system according to claim 3 in which said strobe pulse generating means comprises digital encoding means associated with the movable member for providing a digitised pulse signal indicative of the instantaneous position of the movable member, and coincidence detector means responsive to said digitised pulse signals and to signals from said number generating means for delivering a strobe pulse when the signal from the number generating means corresponds to the instantaneous position of the movable member.

5. A system according to claim 4 in which said digital encoding means comprises a coded disc and means for reading out signals therefrom.

6. A system according to claim 3 in which said strobe pulse generating means comprises sine wave generating means for generating sine wave signals whose phase and frequency are related to the cyclic operation of the number generating means, an electromagnetic transducer associated with the movable member, means for applying said sine wave signals to said transducer, said transducer being adapted to deliver a resultant A.C. signal whose phase relationship with the applied sine wave signals is determined by the instantaneous position of the movable member, and detector means responsive to said resultant A.C. signal for generating a strobe pulse at a predetermined point in each cycle of the resultant A.C. signal.

7. A position responsive switching system for providing at least one output signal corresponding to a predetermined range of positions of a movable member along a given path, comprising cyclically operable number generating means having a total number range corresponding substantially to the total range of movement of the movable member along said given path for providing a succession of output signals each corresponding to a particular position of the movable member within the total range of movement along said given path, sine wave generating means responsive to predetermined output signals from said number generating means for generating sine wave signals of predetermined frequency and phase related to the cyclic operation of the number generating means, strobe pulse generating means associated with the movable member and responsive to said sine wave signals for generating with each cycle of the number generating means a pulse, the phase of which relatively to that cycle of the number generating means is indicative of the instantaneous position of the movable member along said given path, control circuit means responsive to a said sine wave signal and to predetermined output signals from said number generating means for comparing the phase relationship therebetween and providing a corresponding signal for controlling the cyclic frequency of the number generating means in accordance with any phase difference detected, at least one output circuit each comprising gating means and bi-stable switching means, said gating means being responsive to preselected signals from the number generating means corresponding to said predetermined range of positions of the movable member for passing a strobe pulse to said switching means as a set signal only when the movable member is in said predetermined range of positions and for passing a strobe pulse to said switching means as a reset signal when the movable member is without said predetermined range of positions, said switching means commencing an output signal upon receiving a set signal and discontinuing such output signal upon receiving a reset signal.

8. A system according to claim 7 in which said control circuit means comprises detector means responsive to said sine wave signal for providing a first output signal when said sine wave signal crosses its effective zero in a from a more positive to a more negative direction and a second ouput signal when said sine wave crosses its effective zero in a from a more negative to a more positive direction, a second bi-stable switching means, second gating means responsive to predetermined output signals from said number generating means and to said first and second output signals for providing set and reset signals to said second bi-stable switching means, and means for deriving said correcting signal from one output of said second switching means.

9. A system according to claim 7 in which said sine wave generating means comprises, a transformer, a centre tapped primary winding and a secondary winding on said transformer, gating means responsive to predetermined signals from the number generating means, switching means responsive to signals from said gate means for passing current as a step-wise approximation to a half sine wave through alternate halves of said primary winding in alternate half cycles of the number generating means, a capacitor connected across said secondary winding to form a tuned circuit having a resonant frequency substantially equal to a desired cyclic frequency of said number generating means.

10. A position responsive switching system for providing at least one output signal corresponding to a predetermined range of positions of a movable member along a given path, comprising:
cyclically operable number generating means having a total number range corresponding substantially to the total range of movement of the movable member along said given path for providing a succession of output signals each corresponding to a particular position of the movable member within the total range of movement along said given path,
sine wave generating means responsive to predetermined output signals from said number generating means for generating first and second sine wave signals, both of predetermined frequency related to the cyclic operation of the number generating means, and both phase related to the cyclic operation of the number generating means, with a phase difference of substantially 90 electrical degrees between the first and second sine wave signals,
strobe pulse generating means associated with the movable member, and responsive to said first and second sine wave signals for generating with each cycle of the number generating means a pulse, the phase of which relatively to that cycle of the number generating means is indicative of the instantaneous position of the movable member along said given path,
control circuit means responsive to said second sine wave signal and to predetermined output signals from said number generating means for comparing the phase relationship therebetween and providing a correcting signal for controlling the phase difference between the first and second sine wave signals in accordance with any detected phase difference other than 90 degrees,
at least one output circuit each comprising gating means and bi-stable switching means,
said gating means being responsive to preselected signals from the number generating means corresponding to said predetermined range of positions of the movable member for passing a strobe pulse to said switching means as a set signal only when the movable member is in said predetermined range of positions and for passing a strobe pulse to said switching means as a reset signal when the movable member is without said predetermined range of positions,
said switching means commencing an output signal upon receiving a set signal and discontinuing such output signal upon receiving a reset signal.

11. A system according to claim 10 in which said control circuit means comprises:
detector means responsive to said second sine wave signal for providing a first output signal when said second sine wave signal crosses its effective zero in a from a more positive to a more negative direction and a second output signal when said sine wave crosses its effective zero in a from a more negative to a more positive direction,
a second bi-stable switching means,
second gating means responsive to predetermined output signals from said number generating means and to said first and second output signals for providing set and reset signals to said second bi-stable switching means, and
means for deriving said correcting signal from one output of said second switching means.

12. A system according to claim 10 in which said sine wave generating means comprises:
a transformer,
a secondary winding on said transformer having two ends and a centre tap, and
a resistor in series with a capacitor connected between said ends of the secondary winding,
whereby said first sine wave signal can be drawn from said centre tap and the common connection between one said end of the secondary winding and said resistor and said second sine wave signal can be drawn from said centre tap and the common connection between said resistor and said capacitor, said second sine wave signal lagging in phase relatively to said first sine wave signal.

13. A system according to claim 12 in which said resistor comprises a fixed resistor in series with a variable resistor, said variable resistor having a control element responsive to said correcting signal.

14. A system according to claim 13 in which said variable resistor is a thermistor having a resistor element and a heating element to which said correcting signal is applied.

15. A system according to claim 13 in which said variable resistor is a photo-resistor having a resistor element and eliminating means to which said correcting signal is applied.

16. A position responsive switching system for providing a plurality of output signals each corresponding to a predetermined range of positions of a movable member along a given path, comprising:
cyclically operable number generating means having a total number range corresponding substantially to the total range of movement of the movable member along said given path for providing a succession of output signals each corresponding to a particular position of the movable member within the total range of movement along said given path,
strobe pulse generating means associated with the movable member for generating with each cycle of the number generating means a pulse the phase of which relatively to that cycle of the number generating means is indicative of the instantaneous position of the movable member along said given path,
a plurality of output circuits each comprising gating means and bi-stable switching means,
each said gating means being responsive to preselected signals from the number generating means corresponding to one said predetermined range of positions of the movable member for passing a strobe pulse to said switching means as a set signal only when the movable member is in that predetermined range of positions and for passing a strobe pulse to said switching means as a reset signal when the movable member is without that predetermined range of positions,
said switching means initiating an output signal upon receiving a set signal and discontinuing such output signal upon receiving a reset signal.

17. A system according to claim 16 in which each said gating means comprises:
second bi-stable switching means,
second gating means responsive to first preselected signals from said number generating means for providing a set signal to said second bi-stable switching means,
third gating means responsive to second preselected signals from said number generating means for providing a reset signal to said second bi-stable switching means,
fourth gating means responsive to a set output signal from said second bi-stable switching means and to a strobe pulse for passing said strobe pulse to said first-mentioned switching means as a set signal, and
fifth gating means responsive to a reset output signal from said second switching means and to a strobe pulse for passing a strobe pulse to said first-mentioned switching means as a reset signal.

18. A system according to claim 17, including:
first delay means between the set output of said second switching means and said fourth gating means, and second delay means between the re-set output of said second switching means and said fifth gating means.

19. A system according to claim 18 in which said strobe pulse generating means comprises:

sine wave generating means for generating sine wave signals whose phase and frequency are related to the cyclic operation of the number generating means, an electromagnetic transducer associated with the movable member, means for applying said sine wave signals to said transducer, said transducer being adapted to deliver a resultant A.C. signal whose phase relationship with the applied sine wave signals is determined by the instantaneous position of the movable member, and detector means responsive to said resultant A.C. signal for generating a strobe pulse at a predetermined point in each cycle of the resultant A.C. signal.

20. A system according to claim 19 in which said detector means delivers said strobe pulse when said resultant A.C. signal crosses its effective zero in a from a more positive to a more negative direction.

21. A system according to claim 19, in which said transducer is adapted to deliver a second resultant A.C. signal in quadrature with said first-mentioned resultant A.C. signal, said detector means is adapted to provide a first strobe pulse when said first-mentioned resultant A.C. signal crosses its effective zero in a from a more positive to a more negative direction and a second strobe pulse when said first-mentioned resultant A.C. signal crosses its effective zero in a from a more negative to a more positive direction, and comprising:

second detector means responsive to said second resultant A.C. signal adapted to provide a third strobe pulse when said second resultant A.C. signal crosses its effective zero in a from a more positive to a more negative direction and a third strobe pulse when said second resultant A.C. signal crosses its effective zero in a from a more negative to a more positive direction, third bi-stable switching means, sixth gating means responsive to predetermined output signals from the number generating means for providing a set input signal to said third switching means, seventh gating means responsive to any one of said strobe pulses and to a set output from said third switching means for providing an auxiliary strobe pulse in response to any strobe pulse from said first-mentioned and second detector means when said third switching means is set, and switching means for applying selectively the first-mentioned strobe pulse and the auxiliary strobe pulse to said fourth and fifth gating means.

22. A system according to claim 16 in which said number generating means comprises:

a clock generator, a pulse generator responsive to signals from said clock generator, three binary coded decimal counters responsive to pulses from the pulse generator, and diode matrices associated one with each of said counters for providing tens, units and hundreds number generator output signals.

23. A system according to claim 16 in which said number generating means comprises:

a clock generator, a pulse generator responsive to signals from said clock generator, and three ring-of-ten counters responsive to signals from said pulse generator for providing respectively tens, units and hundreds number generator output signals.

24. A system according to claim 17 in which said number generating means comprises:

a clock generator, a pulse generator responsive to signals from asid clock generator, and counting means responsive to signals from said pulse generator for providing tens, units and hundreds number generator output signals, said second and third gating means being also responsive to signals from said pulse generator.

25. A system according to claim 17 in which said number generating means comprises:

a clock generator delivering set and reset outputs, a first pulse generator responsive to said output signals from said clock generator, a second pulse generator responsive to reset output signals from said clock generator, and counting means responsive to signals from said second pulse generator for providing respectively tens, units and hundreds number generator output signals, switching means being provided for applying selectively pulses from said first and second generators to said second and third gating means.

26. A system according to claim 16 in which said given path of the movable member is circular and each cycle of the number generating means corresponds to one revolution of the movable member.

27. A system according to claim 19, in which said given path of the movable member is circular and said transducer is a feed-back synchro resolver.

28. A system according to claim 19 in which said given path of the movable member is linear and said transducer is a linear resolver.

References Cited

UNITED STATES PATENTS

| | | | |
|---|---|---|---|
| 3,051,882 | 8/1962 | Stoudenmire | 307—88.5 X |
| 3,105,228 | 9/1963 | Elliott | 307—88.5 X |
| 3,206,616 | 9/1965 | Webb | 307—88.5 |

JOHN S. HEYMAN, *Primary Examiner.*